United States Patent
Strano et al.

(10) Patent No.: US 9,403,684 B2
(45) Date of Patent: Aug. 2, 2016

(54) COMPOSITIONS, METHODS, AND SYSTEMS FOR SEPARATING CARBON-BASED NANOSTRUCTURES

(71) Applicant: Massachusetts Institute of Technology, Cambridge, MA (US)

(72) Inventors: Michael S. Strano, Lexington, MA (US); Thomas P. McNicholas, Cambridge, MA (US); Andrew J. Hilmer, Cambridge, MA (US); Rishabh M. Jain, Cambridge, MA (US); Kevin C. Tvrdy, Cambridge, MA (US)

(73) Assignee: MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 334 days.

(21) Appl. No.: 13/827,478

(22) Filed: Mar. 14, 2013

(65) Prior Publication Data

US 2014/0199229 A1    Jul. 17, 2014

Related U.S. Application Data

(60) Provisional application No. 61/643,462, filed on May 7, 2012.

(51) Int. Cl.
 *C01B 31/02* (2006.01)
 *B82Y 40/00* (2011.01)

(52) U.S. Cl.
 CPC ............ *C01B 31/0266* (2013.01); *B82Y 40/00* (2013.01)

(58) Field of Classification Search
 CPC ........................... C01B 31/0266; B82Y 40/00
 See application file for complete search history.

(56) References Cited

U.S. PATENT DOCUMENTS

| | | | |
|---|---|---|---|
| 7,772,150 B2 | 8/2010 | Vieth et al. |
| 8,297,444 B2 | 10/2012 | Miller |
| 2008/0274344 A1 | 11/2008 | Vieth et al. |
| 2010/0111814 A1 | 5/2010 | Doorn et al. |
| 2011/0042276 A1 | 2/2011 | Miller |

OTHER PUBLICATIONS

PCT/US2013/31571 International Search and Written Opinion Mailed on Nov. 8, 2013.

*Primary Examiner* — David A Reifsnyder
(74) *Attorney, Agent, or Firm* — Steptoe & Johnson LLP

(57) ABSTRACT

The present invention generally relates to compositions, methods, and systems for separating carbon-based nanostructures.

18 Claims, 23 Drawing Sheets

λexc. = 633nm

COMPOSITIONS, METHODS, AND SYSTEMS FOR SEPARATING CARBON-BASED NANOSTRUCTURES

RELATED APPLICATIONS

This application claims priority under 35 U.S.C. §119(e) to U.S. Provisional Patent Application Ser. No. 61/643,462, filed May 7, 2012, and entitled "Compositions, Methods, and Systems for Separating Carbon-based Nanostructures," which is incorporated herein by reference in its entirety for all purposes.

STATEMENT REGARDING FEDERALLY SPONSORED RESEARCH OR DEVELOPMENT

This invention was made with government support under Grant No. W911NF-07-D-0004 awarded by the Army Research Office. The government has certain rights in this invention.

FIELD OF THE INVENTION

The present invention generally relates to compositions, methods, and systems for separating carbon-based nanostructures.

BACKGROUND OF THE INVENTION

Carbon-based nanomaterials (e.g. carbon nanotubes, graphene fullerenes) have unique electronic, optical, and physical characteristics which make them useful in a variety of applications. Driven by these potential industrial scale applications, these nanomaterials are increasingly being produced in very large/bulk quantities. Most applications require a large degree of control to be demonstrated over the characteristics of these materials. However, many of the manufacturing processes yield heterogeneous products. For example, most single-walled carbon nanotubes (SWNT) synthesis techniques produce mixtures of semiconducting and metallic SWNT. Semiconducting SWNT are desirable for use in field effect transistors and energy harvesting, whereas metallic SWNT hold a great deal of potential for application as transparent electrodes and antennas. Each application requires highly pure semiconducting or metallic SWNT samples. Furthermore, many of the applications for which such SWNT are highly desirable involve chemistry or processing in which purification or selectivity for the desired products remains an inhibitory issue, particularly at large scales.

Accordingly, improved compositions, methods and systems are needed for separating carbon-based nanostructures.

SUMMARY OF THE INVENTION

In some embodiments, a method of at least partially separating a first type of carbon-based nanostructure from at least one second type of carbon-based nanostructure is provided comprising providing a plurality of porous microparticles, wherein each of the plurality of porous microparticles comprise a plurality of nanoparticles associated with the microparticle; exposing the plurality of porous microparticles to a mixture of carbon-based nanostructures comprising the first type of carbon-based nanostructure and the at least one second type of carbon-based nanostructure, wherein the first type of carbon-based nanostructure is attracted to and/or associates with the porous microparticles to an extent greater than that of the at least second type of carbon-based nanostructure; and at least partially separating the porous microparticles from the mixture of carbon-based nanostructures, thereby collecting a set of carbon-based nanostructures that is enriched in the first type of carbon-based nanostructure.

In some embodiments, an article is provided comprising a porous microparticle; and a plurality of nanoparticles associated with the porous microparticle, selected to facilitate separation of the microparticles from a medium.

Figure 1:
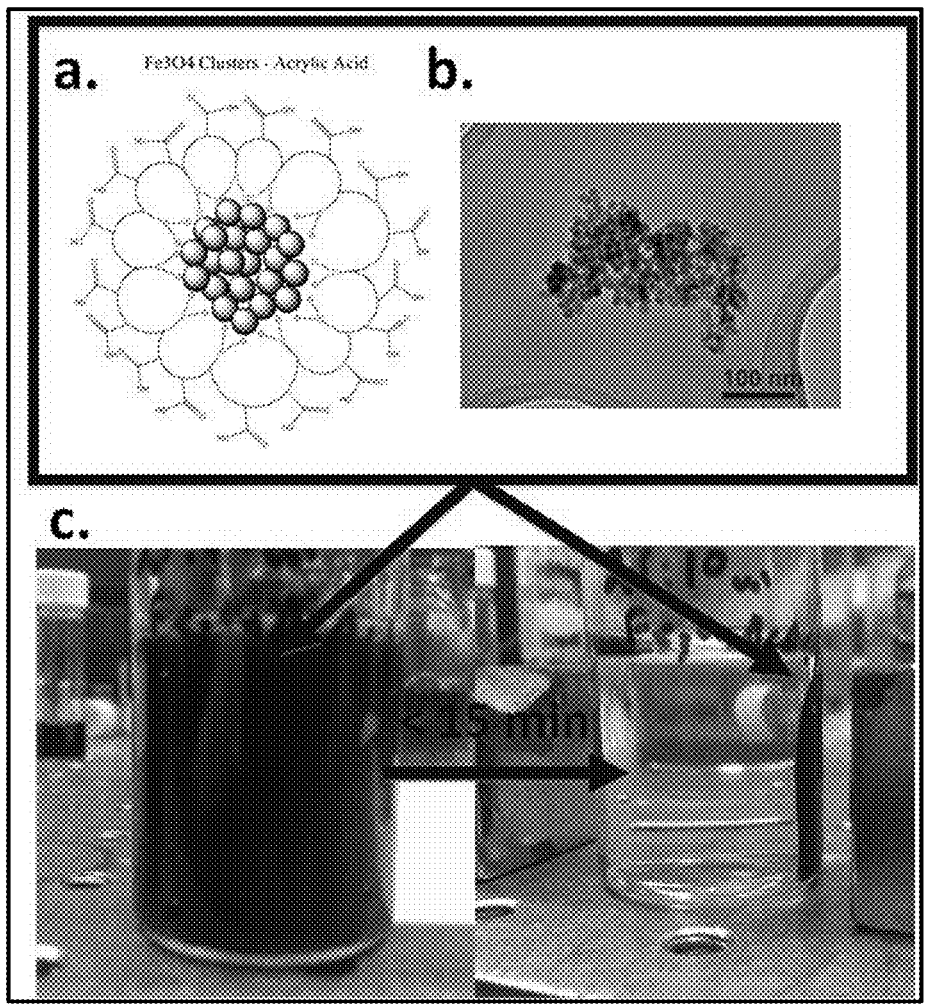
FIG. 1a depicts $Fe_3O_4$ nanoparticles having an average diameter of ~10 nm may be clustered using polyacrylic acid, according to a non-limiting embodiment.
FIG. 1b shows an image of nanoparticles, according to a non-limiting embodiment.
FIG. 1c depicts magnetic separation of nanoparticles in solution, according to some embodiments.

Other aspects, embodiments, and features of the invention will become apparent from the following detailed description when considered in conjunction with the accompanying drawings. The accompanying figures are schematic and are not intended to be drawn to scale. For purposes of clarity, not every component is labeled in every figure, nor is every component of each embodiment of the invention shown where illustration is not necessary to allow those of ordinary skill in the art to understand the invention. All patent applications and patents incorporated herein by reference are incorporated by reference in their entirety. In case of conflict, the present specification, including definitions, will control.

DETAILED DESCRIPTION

The present invention generally relates to the compositions, methods, and systems for separating carbon-based nanostructures. In some embodiments, the compositions, methods, and/or systems may be utilized to separate a first type of carbon-based nanostructure from at least one second type of carbon-based nanostructure. In some embodiments, the compositions, methods, and/or systems may comprise a plurality of porous microparticles.

Without wishing to be bound by theory, the compositions, methods, and/or systems described herein may provide a number of advantages for separating carbon-based nanostructures as compared to the compositions, methods, and/or systems known in the art. For example, the compositions, methods, and/or systems described herein may advantageously not require the use of ultracentrifugation. In addition, many of the compositions, methods, and/or systems described herein may be employed on a larger scale as compared to known compositions, methods, and/or systems.

In some embodiments, a method comprises at least partially separating a first type of carbon-based nanostructure from at least one second type of carbon-based nanostructure. The first type of carbon-based nanostructure and the at least one second type of carbon-based nanostructure may differ by any number of characteristics, including, but not limited to, electrical, chemical, optical, and/or physical characteristics. The first type and the at least one second type of carbon-based nanostructure may be separated by exploiting their at least one differing characteristic.

In some embodiments, the first type of carbon-based nanostructure and the at least one second type of carbon-based nanostructure comprise different magnetic characteristics. In some embodiments, the types of carbon-based nanostructures differ in that each type is metallic, semiconducting, and/or specific (n,m) metallic or semiconducting. In some embodiments, the first type of carbon-based nanostructure is metallic. In some embodiments, the first type of carbon-based nanostructure is semi-conducting. In some embodiments, the second type of carbon-based nanostructure is metallic. In some embodiments, the second type of carbon-based nanostructure is attracted to magnetic fields whereas the at least one second type of carbon-based nanostructure are less magnetic as compared to the first type of carbon-based nanostructure and or are substantially non-magnetic. Accordingly, the first type of carbon-based nanostructure may be separated from the at least one second type of carbon-based nanostructure by exploiting the differences in their magnetic properties.

In some embodiments, the first type of carbon-based nanostructure and the at least one second type of carbon-based nanostructure comprise different chiralities. For example, in some embodiments, the first type of carbon-based nanostructure comprises a first chiral vector and the at least one second type of carbon-based nanostructure comprise a different chiral vector. As will be known to those of ordinary skill in the art, the chiral vector generally defines a degree of twist, and the way of winding such as rightward-winding, leftward-winding and the like. Accordingly, the first type of carbon-based nanostructure may be separated from the at least one second type of carbon-based nanostructure by exploiting the differences in their chirality.

In some embodiments, a first type of carbon-based nanostructures (e.g., following separation from at least one second type of carbon-based nanostructure) may be separated into a first sub-type of carbon-based nanostructures and a second sub-type of carbon-based nanostructures. In one example, the first type of carbon-based nanostructures comprises semiconducting carbon-based nanostructures and the second type of carbon-based nanostructure comprises metallic carbon-based nanostructures. The isolated first type of carbon-based nanostructures may be further separated by exploiting another property, for example, chirality. In some embodiments, a second type of carbon-based nanostructures is separated into a third sub-type of carbon-based nanostructures and a fourth sub-type of carbon-based nanostructures.

Those of ordinary skill in the art will be able to apply similar reasoning to other possible characteristics which may differ between types and sub-types of carbon-based nanostructure and at least one second type of carbon-based nanostructure, for example, via chemical functionalities and shape.

In some embodiments, a composition, a method, and/or system as described herein may make use of porous microparticles. In some embodiments, the porous microparticle is selected so as to assist in separating a plurality of first type of carbon-based nanostructure from a mixture of carbon-based nanostructures. That is, the porous microparticle may be selected so that a greater portion of the at least one first type of carbon-based nanostructure will be attracted to and/or associate with the porous microparticle as compared to the other types of carbon-based nanostructures in the mixture. Accordingly, upon exposure of a mixture of carbon-based nanostructures comprising the first type of carbon-based nanostructure and the at least one second type of carbon-based nanostructure, a greater portion of the first type of carbon-based nanostructure is attracted to and/or associate with the porous microparticle as compared to the at least one second type of carbon-based nanostructure. In some embodiments a method comprises the steps of providing a plurality of porous microparticles, exposing the plurality of porous microparticles to a mixture of carbon-based nanostructures comprising the first type of carbon-based nanostructure and the at least one second type of carbon-based nanostructure, wherein the first type of carbon-based nanostructure is attracted to and/or associates with the porous microparticles to an extent greater than that of the at least one second type of carbon-based nanostructure; and collecting the porous microparticles, thereby separating from the mixture of carbon-based nanostructures, a set of carbon-based nanostructures that is enriched in the first type of carbon-based nanostructure.

In some embodiments, the porous microparticle may comprise a plurality of functional groups. In some cases, the plurality of functional groups aids in the separation of a first type of carbon-based nanostructure from the mixture of carbon-based nanostructures as the first type of carbon-based nanostructure it is attracted to and/or associates with the plurality of functional groups to a greater extent as compared to other types of carbon-based nanostructures in the mixture. This may be particularly useful in embodiments where the first type of nanostructure comprises a complimentary functional groups (e.g., complimentary to the functional groups which are present in the microparticle) which are not present and/or are present to a lesser degree on the other types of carbon-based nanostructures contained in the mixture. The plurality of functional groups may be a portion of the material which forms the microparticle (e.g., the microparticle is formed of a polymeric material, wherein the polymeric material comprises the plurality of functional groups) and/or is portion of a material which is associated with the microparticle (e.g., a portion of a nanoparticle which is associated with the microparticle; as described herein).

In some embodiments, the interaction between the carbon-based nanostructures and the microparticle may comprise formation of a bond, such as a covalent bond (e.g. carbon-carbon, carbon-oxygen, oxygen-silicon, sulfur-sulfur, phosphorus-nitrogen, carbon-nitrogen, metal-oxygen or other covalent bonds), an ionic bond, a hydrogen bond (e.g., between hydroxyl, amine, carboxyl, thiol, and/or similar functional groups, for example), a dative bond (e.g., complexation or chelation between metal ions and monodentate or multidentate ligands), and the like. The interaction may also comprise Van der Waals interactions. In some embodiments, the interaction is a covalent interaction. Non-limiting examples of covalent interactions include, but are not limited to, diazonium chemistries, click chemistries, and the like. In other embodiments, the interaction is a non-covalent interaction. For instance, in some embodiments, the microparticle selectively dopes carbon-based nanostructures. In some such cases, the doping interaction may depend on the electronic band structure of the carbon-based nano structures. For example, a metallic carbon-based nanostructure with a large surface electron density and compact surfactant packing may not be doped, whereas as a semiconducting carbon-based nanostructure may be doped. In some embodiments, the selective doping is used to separate a first type of carbon-based nanostructures and at least one second type of carbon-based nanostructures. Non-limiting examples of non-covalent interactions include, but are not limited to, adhesion chemistries, aminated chemistries/surfaces, and the like.

In some embodiments, the plurality of functional groups and/or other properties may be imparted to the microparticles by associating a plurality of nanoparticles with a microparticle. The nanoparticles may be associated with the microparticles using techniques and methods known to those of ordinary skill in the art, as described herein. The nanoparticles may be present on the surface of the microparticle and/or dispersed throughout the pores of the microparticle.

In some embodiments, the plurality of nanoparticles may be selected to facilitate separation of the microparticles from a medium (e.g., a liquid, a gas, a solid, etc.). For example, in some embodiments, the plurality of nanoparticles is magnetic, wherein the porous microparticle becomes magnetic upon association of the nanoparticles. Accordingly, the microparticles may be isolated and/or collected from the medium by exploiting the magnetic properties of the microparticles, as described herein. In some cases, the nanoparticles are paramagnetic, superparamagnetic, ferromagnetic, ferrimagnetic or demonstrate any other type of magnetic behavior. In some embodiments, the nanoparticles are substantially formed of or comprise a magnetic material.

In addition to facilitating the separation of the microparticles from a medium, the nanoparticles may aid in the separation of the first type of carbon-based nanostructure from a mixture of carbon-based nanostructures in embodiments where the first type of carbon-based nanostructure are attracted to magnetic fields and the at least one second type of carbon-based nanostructure are attracted to magnetic fields to a lesser degree as compared to the first type of carbon-based nanostructure and/or are non-magnetic.

In some embodiments, the nanoparticles may be functionalized with one or more functional groups which aid in the association and/or binding of a targeted carbon-based nanostructure. For example, in some embodiments, the nanoparticles comprise a core which is magnetic and a shell at least partially encapsulating the magnetic core, wherein the shell comprises a plurality of functional groups which aid in the association and/or binding of a targeted type of carbon-based nanostructure. Suitable functional groups for use in aiding the association and/or binding of targeted types of carbon-based nanostructure are described herein.

In some embodiments, a nanoparticle comprises a core and a shell at least partially encapsulating the core, wherein the core and/or the shell comprises a magnetic material and optionally the other component comprises a non-magnetic or substantially nonmagnetic material. Non-limiting examples of magnetic materials include, but are not limited to, $Fe_3O_4$, $Fe_2O_3$, Fe, and Cu. Non-limiting examples of non-magnetic or substantially non-magnetic materials include, but are not limited to, Au, Ag, $SiO_x$, and other polymeric materials. In a particular example, the nanoparticle comprises a magnetic core (e.g., $Fe_3O_4$) and an Au coating substantially encapsulating the magnetic core. In some embodiments, the shell comprises a plurality of functional groups.

A microparticle associated with a plurality of nanoparticles may be formed using techniques commonly known to those of ordinary skill in the art. In some embodiments, the microparticle may be associated with a plurality of nanoparticles by exposing the microparticle to a solution comprising a plurality of nanoparticles. The nanoparticles may also be covalently linked and/or absorbed onto the surface of and/or into the pores of the porous microparticle.

The pores of the porous microparticle may comprise any suitable range of sizes and/or be substantially uniform in size. In some cases, the pores may or might not be visible using imaging techniques (e.g., scanning electron microscope). The pores may be open and/or closed pores. In some cases, the average pore size is about 0.1 nm, about 0.5 nm, about 1 nm, about 2 nm, about 3 nm, about 4 nm, about 5 nm, about 6 nm, about 7 nm, about 8 nm, about 9 nm, about 10 nm, about 20 nm, about 50 nm, about 100 nm, about 200 nm, about 300 nm, about 400 nm, about 500 nm, about 600 nm, about 700 nm, about 800 nm, about 900 nm, or about 100 nm. In some cases, the average pore size is or between about 1 and about 500 nm, or between about 1 and about 400 nm, or between about 1 and about 300 nm, or between about 1 and about 200 nm, or between about 1 and about 100 nm, or between about 1 and about 50 nm, between about 1 and about 20 nm, or between about 1 and about 10 nm, or between about 10 and about 200 nm, or between about 10 and about 100 nm, or between about 10 and about 50 nm. In some cases, the pore size may be selected so as to facilitate the association of carbon-based nanostructures with the porous microparticle. In some cases, the pore size is selected so as to be large enough to allow for the carbon-based nanostructures to be contained in the pores and/or to provide the maximum surface area possible.

The porous microparticles may be formed of any suitable material. In some embodiments, the porous microparticles are formed of a polymeric material. Those of ordinary skill in the art will be aware of suitable materials for use as a porous microparticle. In some embodiments, the material comprises a plurality of functional groups, for example, amine functional groups. In some embodiments, the plurality of functional groups may aid in the separation of a first type of carbon-based nanostructure from a mixtures of carbon-based nanostructure, as described herein. In some cases, the porous microparticle comprises sephacryl. Other non-limiting examples of suitable materials include, but are not limited to, agarose and similarly structured porous polymers, polymers comprising amine groups, and polymers comprising amide groups. In some embodiments, the suitable material is a polymer network.

The microparticle may be of any suitable size. The plurality of microparticles, in some embodiments, may be characterized by an average diameter (e.g., the average diameter for the plurality of particles). In some embodiments, the diameter of the microparticles may have a Gaussian-type distribution. In some cases, the plurality of microparticles may have an average diameter of less than about 500 um (micrometers), less than about 400 um, less than about 300 um, less than about 250 um, less than about 200 um, less than about 150 um, less than about 100 um, less than about 50 um, less than about 40 um, less than about 30 um, less than about 10 um, less than about 5 um, less than about 3 um, or less than about 1 um. In some embodiments, the microparticles may have an average diameter of about 5 um, about 10 um, about 30 um, about 40 um, about 50 um, about 100 um, about 150 um, about 200 um, about 250 um, about 300 um, about 400 um, about 500 um, or greater. In some embodiments, the microparticles may have an average diameter of greater than about 5 um, greater than about 10 um, greater than about 30 um, greater than about 40 um, greater than about 50 um, greater than about 100 um, greater than about 150 um, greater than about 200 um, greater than about 250 um, greater than about 300 um, greater than about 400 um, greater than about 500 um, or greater. In some cases, the microparticles have an average size between about 1 um and about 500 um, between about 40 um and about 500 um, between about 50 um and about 500 um, between about 40 um and about 40 um, between about 50 um and about 400 um, between about 40 um and about 300 um, between about 50 um and about 300 um, between about 50 um and about 200 um, or between about 50 um and about 100 um. In a particular embodiment, the microparticles have an average size of at least 50 um, or at least 40 um.

The plurality of nanoparticles associated with the microparticles may be of any suitable size. The plurality of nanoparticles, in some embodiments, may be characterized by an average diameter (e.g., the average diameter for the plurality of particles). In some embodiments, the diameter of the nanoparticles may have a Gaussian-type distribution. In some cases, the plurality of nanoparticles may have an average diameter of less than about 500 nm, less than about 400 nm, less than about 300 nm, less than about 250 nm, less than about 200 nm, less than about 150 nm, less than about 100 nm, less than about 50 nm, less than about 40 nm, less than about 30 nm, less than about 20 nm, less than about 10 nm, less than about 5 nm, less than about 3 nm, or less than about 1 nm. In some embodiments, the nanoparticles may have an average diameter of about 5 nm, about 10 nm, about 20 nm, about 30 nm, about 40 nm, about 50 nm, about 100 nm, about 150 nm, about 200 nm, about 250 nm, about 300 nm, about 400 nm, about 500 nm, or greater. In some embodiments, the nanoparticles may have an average diameter of about 5 nm, about 10 nm, about 15 nm, about 20 nm, about 25 nm, about 30 nm, about 40 nm, about 50 nm, about 100 nm, about 150 nm, about 200 nm, or greater. In some cases, the nanoparticles have an average size between about 1 nm and about 1 um, between about 1 nm and about 500 nm, between about 1 nm and about 400 nm, or between about 1 nm and about 200 nm, between about 1 nm and about 100 nm, between about 1 nm and about 50 nm, between about 10 nm and about 50 nm, between about 10 nm and about 40 nm, between about 10 nm and about 30 nm, or between about 15 nm and about 25 nm.

It should be understood that the average nanoparticle and/or microparticle size may be determined by measuring an average cross-sectional dimension (e.g., diameter for substantially spherical nanoparticles and/or microparticles) of a representative number of nanoparticles and/or microparticles. For example, the average cross-sectional dimension of a substantially spherical nanoparticle and/or microparticle is its diameter; and, the average cross-sectional dimension of a non-spherical nanoparticle and/or microparticle is the average of its three cross-sectional dimensions (e.g., length, width, thickness), as described further below. The nanoparticle and/or microparticle size may be determined using microscopy techniques, such as scanning electron microscope or transmission electron microscopy techniques or optical techniques, such as dynamic light scattering.

In some embodiments, the microparticles described herein may be employed in methods for at least partially separating a first type of carbon-based nanostructure from at least one second type of carbon-based nanostructure. In some cases, the method comprises providing a plurality of porous microparticles, wherein each of the plurality of porous microparticles (optionally wherein each comprise a plurality of nanoparticles associated with the microparticle); exposing the plurality of porous microparticles to a mixture of carbon-based nanostructures comprising the first type of carbon-based nanostructure and the at least one second type of carbon-based nanostructure, wherein the first type of carbon-based nanostructure is attracted to and/or associates with the porous microparticles to an extent greater than that of the at least second type of carbon-based nanostructure; and at least partially separating the porous microparticles, thereby separating from the mixture of carbon-based nanostructures, a set of carbon-based nanostructures that is enriched in the first type of carbon-based nanostructure.

In some embodiments, the methods, systems, and articles described herein may be used to partially separate a first type of carbon-based nanostructure from at least one second type of carbon-based nanostructure in sufficient quantities. In some cases, the amount of the first type of carbon-based nanostructure at least partially separated from the at least one second type of carbon-based nanostructure is greater than about or about 1 mg, greater than about or about 5 mg, greater than about or about 10 mg, greater than about or about 20 mg, greater than about or about 30 mg, greater than about or about 40 mg, greater than about or about 50 mg, greater than about or about 60 mg, greater than about or about 70 mg, greater than about or about 80 mg, greater than about or about 90 mg, greater than about or about 100 mg, greater than about or about 120 mg, greater than about or about 150 mg, greater than about or about 200 mg, greater than about or about 300 mg, greater than about or about 400 mg, greater than about or about 500 mg, or greater.

Those of ordinary skill in the art will be aware of suitable methods for exposing a plurality of microparticles to a plurality of carbon-based nanostructures. For example, in some embodiments, a solution comprising the plurality of microparticles is exposed to a solution comprising the mixture of carbon-based nanostructures. In some cases, upon exposure of the microparticles to the mixture of carbon-based nanostructures, a solution comprising the mixture may be agitated (e.g., stirring, shaking, centrifugation, sonication). In some embodiments, prior to exposing the microparticles to the mixture of carbon-based nanostructures, the carbon-based nanostructures may be sufficiently dispersed in a solution (e.g., via stirring, shaking, sonication, via addition of a surfactant (e.g., sodium dodecyl sulfate), etc.).

In some embodiments, the carbon-based nanostructures may be associated with a surfactant. In some embodiments, at least one surfactant is used to disperse the carbon-based nanostructures. In some embodiments, the surfactant may interact with carbon-based nanostructures, as described for interactions with a microparticle. In some embodiments, the interaction between the surfactant and carbon-based nanostructures may help to separate a first type of carbon-based nanostructures from a second type of carbon-based nanostructures. Non-limiting examples of surfactants include ionic surfactants (e.g., sodium dodecyl sulfate, sodium cholate, ammonium lauryl sulfate, sodium lauryl ether sulfate, sodium myreth sulfate, dioctyl sodium sulfosuccinate, cetyl trimethylammonium chloride, cetylpyridinium chloride, benzalkonium chloride), zwitterionic surfactants, and non-ionic surfactants (e.g., cetyl alcohol, stearyl alcohol, and cetostearyl alcohol, triton X-100, sorbitan alkyl esters, block copolymers of polyethylene glycol and polypropylene glycol, nonoxynol-9).

Those of ordinary skill in the art will be able to select suitable conditions for exposing the carbon-based nanostructures to the microparticles. In some embodiments, the conditions may be varied to provide optimized separation of a first type of carbon-based nanostructure from at least one second type of carbon-based nanostructure. Non-limiting examples of parameters that may be varied include concentration of the carbon-based nanostructures versus the microparticles, length of exposure time of the carbon-based nanostructures to the microparticles, agitation, etc. The composition of the isolated carbon-based nanostructures using a particular set of conditions may be analyzed using techniques known in the art. For example, a portion of the microparticles may be removed from solution at varying time points and the carbon-based nanostructures associated with the microparticles may be analyzed to determine the composition of the isolated carbon-based nanostructures, for example, using absorbance spectroscopy techniques.

The mixture of carbon-based nanostructures may be exposed to the microparticles for any suitable period of time. In some embodiments, the amount of time the mixture of the carbon-based nanostructures is exposed to the microparticles depends on various factors, such as the property used to separate the carbon-based nanostructures. In some embodiments, the amount of time the microparticles are exposed to the carbon-based nanostructures may be adjusted to optimize the isolation of the first type of carbon-based nanostructures. In some embodiments, the carbon-based nanostructures may be exposed to the microparticles for less than or equal to about 36 hours, less than or equal to about 30 hours, less than or equal to about 24 hours, less than or equal to about 18 hours, less than or equal to about 12 hours, less than or equal to about 6 hours, less than or equal to about 3 hours, less than or equal to about 2 hours, less than or equal to about 1 hour, or less than or equal to about 30 minutes. In some instances, the carbon-based nanostructures may be exposed to the microparticle for at least 10 minutes, at least 30 minutes, at least 1 hour, at least 3 hours, at least 6 hours, at least 12 hours, at least 18 hours, at least 24 hours, at least 30 hours. In one example, separation based on chirality may utilize a relatively short exposure time (e.g., less than or equal to about 3 hours).

The mixture of carbon-based nanostructures may be exposed to any suitable concentration of the microparticles. In some embodiments, the concentration of the microparticles versus the carbon-based nanostructures may be adjusted to optimize the isolation of the first type of carbon-based nanostructures. In some embodiments, the volumetric ratio of a colloidal suspension of microparticles to a solution comprising carbon-based nanostructures may be at least about 1, at least about 2, at least about 4, at least about 6, at least about 8, at least about 10, at least about 15, at least about 20, or at least about 30. In certain embodiments, the volumetric ratio of a colloidal suspension of microparticles to a solution comprising carbon-based nanostructures may be between about 1 and about 30, between about 1 and about 20, between about 1 and about 15, between about 1 and about 10, between about 2 and about 10, between about 4 and about 10, or between about 6 and about 10. The concentration of microparticles in the colloidal suspension may be determined by measuring the volume fraction of microparticles in the suspension after sedimentation. In some embodiments, the percentage of microparticles in the suspension is about 75% and the concentration of carbon-based nanostructures in the solution comprising carbon-based nanostructures is about 1 mg/ml. In some embodiments, the percentage of microparticles in the suspension is at least about 65%, at least about 68%, at least about 70%, at least about 72%, at least about 75%, at least about 78%, at least about 80%, at least about 82%, or at least about 85%. In some embodiments, the percentage of microparticles in the suspension is between about 65% and about 85%, between about 70% and about 85%, between about 75% and about 85%, between about 75% and about 80%, between about 70% and about 75%. In some embodiments, the concentration of carbon-based nanostructures in the solution comprising carbon-based nanostructures is at least about 0.25 mg/ml, at least about 0.5 mg/ml, at least about 0.75 mg/ml, at least about 1 mg/ml, at least about 1.25 mg/ml, at least about 1.5 mg/ml, at least about 1.75 mg/ml, at least about 2 mg/ml. In some embodiments, the concentration of carbon-based nanostructures in the solution comprising carbon-based nanostructures is between about 0.25 mg/ml to about 2 mg/mL, between about 0.5 mg/ml to about 2 mg/mL, between about 0.75 mg/ml to about 2 mg/mL, between about 1 mg/ml to about 2 mg/mL, or between about 0.25 mg/ml to about 1 mg/mL. Those of ordinary skill in the art will be aware of suitable methods and techniques for at least partially separating and/or collecting the porous microparticles following exposure of the porous microparticles to a mixture of carbon-based nanostructures. For example, in embodiments where the porous microparticles are magnetic techniques and methods may include, but are not limited to, magnetic isolation, high-gradient magnetic separation (HGMS), and magnetic filtration.

Magnetic isolation techniques and methods will be known to those of ordinary skill in the art and generally involve placing the porous microparticles (e.g., associated with carbon-based nanostructure(s)) in a magnetic field and extracting the magnetic microparticles with a "load" or bound carbon-based nanostructures. Alternatively, the magnetic field may be used to isolate this magnetic component and the non-magnetic material may then be removed, for example, by decantation. See the Examples section for a more detailed description.

HGMS techniques and/or methods will be known to those of ordinary skill in the art and generally involve the use of a high surface area material which can provide for a large magnetic gradient. In some embodiments, a heterogeneous material containing magnetic and selectively bound microparticles (e.g., associated with carbon-based nanostructure(s)) is placed in the high magnetic gradient and isolated. Generally, the non-magnetic and therefore un-bound material may then be removed and the isolated material may then be recovered by simply removing it from the magnetic field.

Magnetic filtration techniques and/or methods will be known to those of ordinary skill in the art and generally involve a specific material in a heterogeneous solution phase mixture being bound to a magnetic particle and then redirecting its flow-rate or direction. Examples of such processes are described in the Examples section. Such techniques allows for the magnetic microparticles and any bound materials (e.g., carbon-based nanostructure(s)) to be isolated by directing the flow relative to the impurity, which may be other metallic or carbon impurities, including SWNT of differing electronic type or chirality.

In some embodiments, collection of the microparticles may be achieved by directly placing a source magnet, optionally protected by a (removable) protective jacket, in the sample liquid in order to isolate and collect the magnetic microparticles (e.g., associated with carbon-based nanostructures. This may be accomplished in liquid samples which are stationary or flowing. In the case of batch collection, the magnetic microparticles may be collected and retained while the supernatant, or non-adsorbed material, is decanted or otherwise extracted. Alternatively, this extraction may be achieved by removing the magnet with the magnetic microparticles attached. After removing, optionally iteratively, the magnet with bound payload, the magnet may be removed from the jacket and the magnetic microparticles may be isolated.

Following collection of the microparticles associates with a plurality of carbon-based nanostructures, the carbon-based nanostructures may optionally be isolated and/or separated from the microparticles. Those of ordinary skill in the art will be aware of methods and techniques for separating the carbon-based nanostructures from the microparticles. For example, the isolated microparticles may be exposed to a reagent which aids in severing of bonds and/or the disassociation of the carbon-based nanostructures from the microparticles. In some embodiments, the reagent is a surfactant.

In some embodiments, a method of the present invention comprises at least one wash step. Those of ordinary skill need art will be aware of methods and/or techniques carrying out a wash step.

While many of the methods and systems described herein do not make use of ultracentrifugation, in some embodiments, a method and/or system may make use of ultracentrifugation. See, for example, Example 4.

As used herein, the term "carbon-based nanostructure" refers to articles having a fused network of aromatic rings, at least one cross-sectional dimension of less than about 1 micron, and comprising at least about 30% carbon by mass. In some embodiments, the carbon-based nanostructures may comprise at least about 40%, at least about 50%, at least about 60%, at least about 70%, at least about 80%, at least about 90%, or at least about 95% of carbon by mass, or more. The term "fused network" might not include, for example, a biphenyl group, wherein two phenyl rings are joined by a single bond and are not fused. Example of carbon-based nanostructures include carbon nanotubes (e.g., single-walled carbon nanotubes, double-walled carbon nanotubes, multi-walled carbon nanotubes, etc.), carbon nanowires, carbon nanofibers, carbon nanoshells, graphene, fullerenes, and the like.

In some embodiments, a carbon-based nanostructure may have a least one cross-sectional dimension of less than about 500 nm, less than about 250 nm, less than about 100 nm, less than about 75 nm, less than about 50 nm, less than about 25 nm, less than about 10 nm, or, in some cases, less than about 1 nm. Carbon-based nanostructures described herein may have, in some cases, a maximum cross-sectional dimension of less than about 1 micron, less than about 500 nm, less than about 250 nm, less than about 100 nm, less than about 75 nm, less than about 50 nm, less than about 25 nm, less than about 10 nm, or, in some cases, less than about 1 nm. In some instances, the carbon-based nanostructures described herein may have, two orthogonal maximum cross-sectional dimension of less than about 1 micron, less than about 500 nm, less than about 250 nm, less than about 100 nm, less than about 75 nm, less than about 50 nm, less than about 25 nm, less than about 10 nm, or, in some cases, less than about 1 nm. As used herein, the "maximum cross-sectional dimension" of a structure (e.g., a carbon-based nanostructure, an active growth structure, etc.) refers to the largest distance between two opposed boundaries of the structure that may be measured. The "average maximum cross-sectional dimension" of a plurality of structures refers to the number average.

In some embodiments, the carbon-based nanostructures described herein may comprise carbon nanotubes. As used herein, the term "carbon nanotube" is given its ordinary meaning in the art and refers to a substantially cylindrical molecule or nanostructure comprising a fused network of primarily six-membered rings (e.g., six-membered aromatic rings) comprising primarily carbon atoms. In some cases, carbon nanotubes may resemble a sheet of graphite formed into a seamless cylindrical structure. It should be understood that the carbon nanotube may also comprise rings or lattice structures other than six-membered rings. Typically, at least one end of the carbon nanotube may be capped, i.e., with a curved or nonplanar aromatic structure. Carbon nanotubes may have a diameter of the order of nanometers and a length on the order of millimeters, or, on the order of tenths of microns, resulting in an aspect ratio greater than 100, 1000, 10,000, 100,000, $10^6$, $10^7$, $10^8$, $10^9$, or greater. Examples of carbon nanotubes include single-walled carbon nanotubes (SWNTs), double-walled carbon nanotubes (DWNTs), multi-walled carbon nanotubes (MWNTs) (e.g., concentric carbon nanotubes), inorganic derivatives thereof, and the like. In some embodiments, the carbon nanotube is a single-walled carbon nanotube. In some cases, the carbon nanotube is a multi-walled carbon nanotube (e.g., a double-walled carbon nanotube). In some cases, the carbon nanotube may have a diameter less than about 1 micron, less than about 500 nm, less than about 250 nm, less than about 100 nm, less than about 50 nm, less than about 25 nm, less than about 10 nm, or, in some cases, less than about 1 nm.

The isolated carbon-based nanostructures obtained using the compositions, methods, and/or systems as described herein may find use in any number of applications, as will be known to those of ordinary skill in the art. Non-limiting examples include electronics, antennas, energy harvesting and storage, chemical and biological sensing, bio-imaging, and/or medical treatment.

The following examples are intended to illustrate certain embodiments of the present invention, but do not exemplify the full scope of the invention.

EXAMPLES

Owing to their exceptional characteristics, carbon nanomaterials are highly sought after for applications including electronics, antennas, energy harvesting and storage, chemical and biological sensing, bio-imaging and medical treatment. Their performance in these applications largely depends on their electronic, optical and physical characteristics. As such, developing methods with which homogenous materials can be isolated is an important and active area of research.

This example presents an approach towards single walled carbon nanotube separation that makes use of several features, including, but not limited to:
1) A magnetic nanoparticle or collection of nanoparticles embedded into a matrix (e.g., microparticles) that also serves as an adsorbent for the carbon-based nanostructures.
2) The adsorbent which may demonstrate a high affinity towards one particular carbon-based nanostructure (e.g., metallic, semiconducting or specific (n,m) metallic or semiconducting SWNT). This affinity may also extend to their optical isomers as well;
3) The nanoparticles may exist as superparamagnetic nanoparticles, ferromagnetic nanoparticles or ferrimagnetic nanoparticles, and/or in a core-shell construct;
4) In the case of core-shell type magnetic nanoparticles, the core can be magnetic and the shell may exist as one of several forms, including Au, SiOx or other material that may promote selective binding of SWNT by electronic type;
5) The particle, which includes nanoparticle matrices, can be porous or otherwise displayed with high surface area chemistry that promotes binding to the surface of one particular SWNT type;
6) This chemistry can be either covalent (e.g., aryl diazonium salts) or non-covalent amongst others and may include, but is not limited to, electron rich chemical groups, lone pair electrons, or preferential adsorption mechanisms;
7) Separation of SWNT species from heterogeneous mixtures may be accomplished in either batch preparations or in continuous flow preparations;
8) The adsorbents may have properties so that they may eliminate the widely used ultracentrifuge process for purifying carbon nanotubes from their bundled aggregates. Ultracentrifugation is a process that is costly and difficult to scale at the practical levels required for purification of individually suspended SWNT from bundled aggregates. The adsorbent may be used to selectively pull out these species from solution, leaving the bundles for further processing and recycling; and
9) The process described to separate SWNT species is compatible with scaling technologies described herein, for example magnetic isolation, high-gradient magnetic separation (HGMS) and/or magnetic filtration.

It should be understood, that while this example focuses on separating SWNT, this is by no means limiting, and those of ordinary skill in the art will be able to apply these techniques to other types of carbon-based nanostructures.

Magnetic Particles:

Magnetic particles, whether on the nanometer, micrometer or macroscopic level, are versatile materials which can be used in bio-imaging, sensing and in material separation. Several magnetic nanoparticle systems have been developed which may be generally applied to the selective separation of distinct species from material mixtures and impurities. With these magnetic particles, such purification and separation can be conducted simply and easily using a magnetic field. This method is used in concert with other chemistries also illustrated herein.

To date, the preparation of individually dispersed SWNT solutions have largely relied on ultracentrifugation as a purification method. However, ultracentrifugation is dangerous, costly, and difficult, if not impossible, to scale to meet industrial requirements. Here, the methods described herein can circumvent this purification step and relies on selectively adsorbant magnetic beads to isolate such purified individually dispersed SWNT solutions.

The formation of covalent bonds to specific SWNT species is a powerful tool which is particularly useful in material separation. The strength of covalent bonds makes them useful even in separation processes which involve relatively strong forces, including strong magnetic fields and large G-forces. Several methods for establishing selective covalent bond formation, particularly in the context of SWNT, are discussed in this example. These include, but are not limited to, diazonium chemistry and click chemistry.

In addition to those chemistries which take advantage of covalent bond formation, non-covalent forces can be used to aid in SWNT separation. While these bonds are not compatible with the same large forces available to covalent chemistry based separations, these forces are generally applicable with "gentler" separation processes. Like with covalent chemistry, these separation processes may also include magnetic forces, but are generally not compatible with higher magnetic or G-forces. However, these chemistries also include separation based on selective adhesion and adsorption.

After selective binding is established, one or several different techniques and/or methods can be used to achieve magnetically isolated materials. These processes can include magnetic isolation, high-gradient magnetic separation (HGMS) and/or magnetic filtration. Each method comprises applying a magnetic field in order to displace and isolate the magnetic microparticles and their bound material, or "payload."

Non-Limiting Embodiments

I) Magnetic Particle Formation:

Magnetic particles have previously been successfully utilized in various material separation schemes. Magnetic particles can have diameters ranging from a few nanometers to hundreds of microns and larger. Generally speaking, magnetic nanoparticles, including particle clusters, with diameters less than or equal to 70 nm, cannot be permanently captured using simple magnetic separation. That is to say that that below that size limit, the magnetic field necessary to exceed free-energy surpasses the capability of most magnets. This fact is illustrated by the equation for magnetic force described by Equation 1:

$$F_m = \mu_0 V_p M_p \cdot \nabla H \quad \text{(Eq. 1)}$$

where $F_m$ is the magnetic force exerted on a particle, $\mu_0$ is permeability of free space, $V_p$ is the particle volume, $M_p$ is the magnetization of the particle, and H is the magnetic field at the location of the particle.

The nanoparticles developed herein generally have, but are not limited to, those having average diameter in excess of 50 nm. This particle may include, but is not limited to metallic nanoparticle-polymer complexes, nanoparticle clusters, large metallic nanoparticles, metallic alloy magnetic nanoparticles, and core-shell nanoparticles. An example of such magnetic nanoparticle clusters can be seen in FIG. 1. The magnetic components may comprise $Fe_3O_4$, $Fe_2O_3$, Fe, and/or Cu. In the case of magnetic core-shell nanoparticle, the core may comprise $Fe_3O_4$, $Fe_2O_3$, Fe, Cu, etc. and the shell may comprise Au, Ag, $SiO_x$, polymer coatings, etc. Similarly, these core-shell particles may comprise a core comprised of Au, Ag, $SiO_x$, polymer coatings, etc. coated by a shell comprising $Fe_3O_4$, $Fe_2O_3$, Fe, Cu, etc. An example of such coated magnetic nanoparticles can be seen in FIG. 2. Here, nanoparticles with a diameter of ~10 nm can be seen having a magnetic core ($Fe_3O_4$, d ~7 nm) with a Au coating (thickness ~1.5 nm). This Au coating accounts for the red color of such nanoparticle solutions.

FIG. 1. a) $Fe_3O_4$ nanoparticles having an average diameter of ~10 nm may be clustered using polyacrylic acid; b) These clusters usually have diameters ≥70 nm, which is the approximate lower limit for successful magnetic separation; c) Such magnetic separation occurs quickly, usually in less than 15 min, and maybe accomplished by placing magnetic nanoparticle/cluster solutions in a magnetic field.

Figure 2:
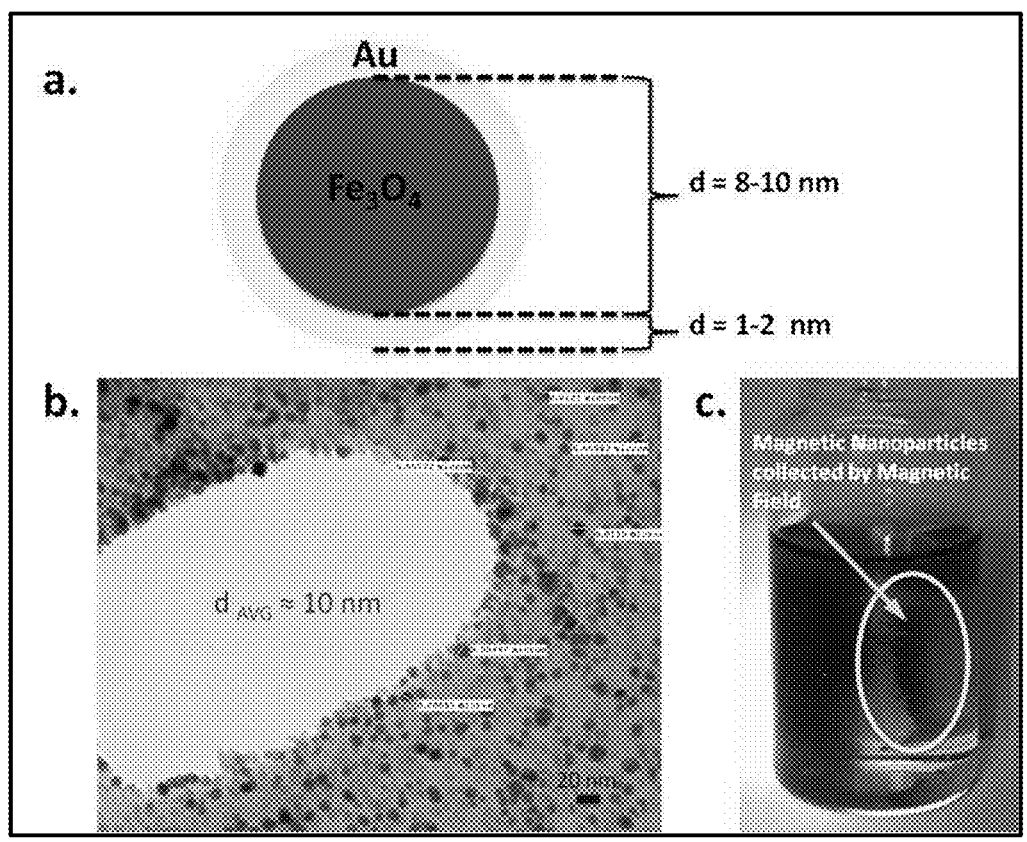
FIG. 2a depicts a non-limiting example of a core/shell magnetic nanoparticle, according to some embodiments.
FIG. 2b shows an image of nanoparticles, according to a non-limiting embodiment.
FIG. 2c shows a solution containing nanoparticles, according to a non-limiting embodiment.

FIG. 2. a) A non-limiting example of a core/shell magnetic nanoparticle is a particle having a $Fe_3O_4$ core and an Au shell; b) In this figure, nanoparticles having a diameter of ~10 nm can be seen having a magnetic core ($Fe_3O_4$, d ~7 nm) with a Au coating (thickness ~1.5 nm); c) The Au shell accounts for the red coloring of such nanoparticle solutions. These nanoparticles can be collected by simply using an external magnetic field.

Such magnetic particles may either be formed as part of a complex structure which contains, or may be further functionalized with, a variety of components which selectively bind or bond to specific types of SWNT. The magnetic components may either be covalently linked to these components or may be adsorbed onto or into a component or framework which provides for the desired selective binding of the SWNT. An example of magnetic nanoparticles bound to porous polymer framework (e.g., microparticle) can be seen in FIG. 3.

Figure 3:
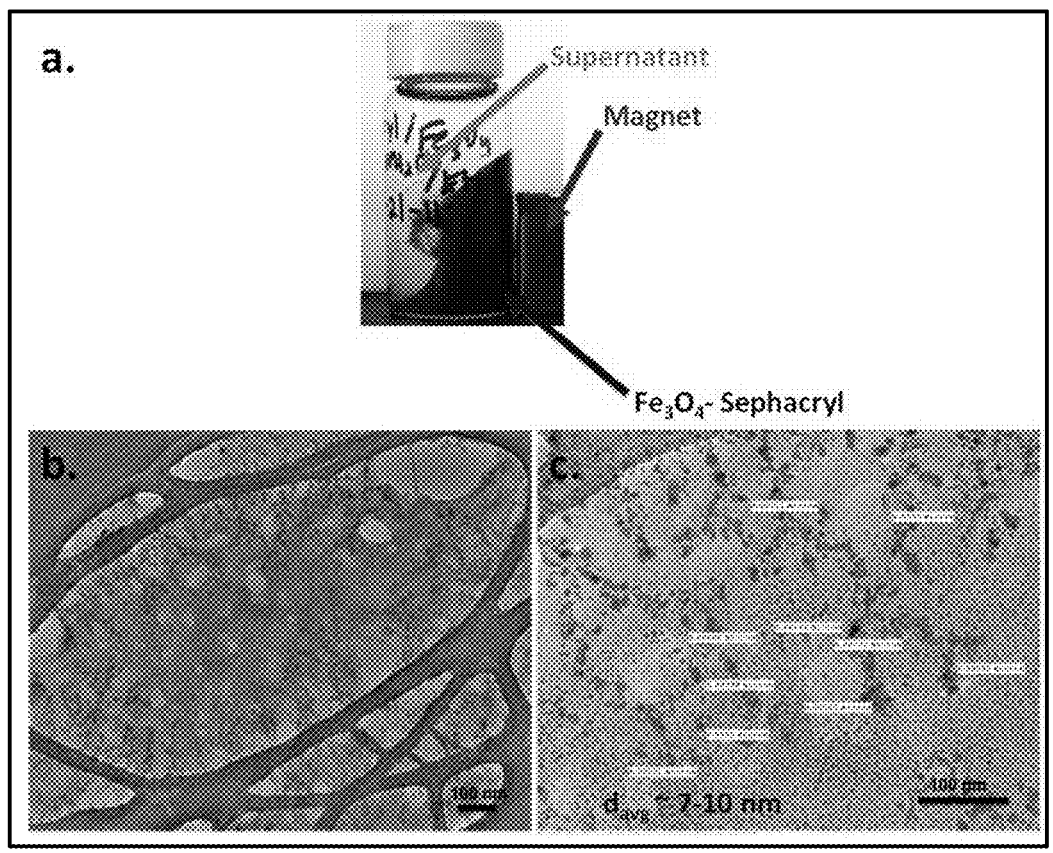
FIG. 3a shows an image of $Fe_3O_4$ particles deposited on a porous polymer matrix, according to a non-limiting embodiment.
FIG. 3b shows TEM images of porous microparticles comprising a plurality of nanoparticles, according to a non-limiting embodiment.
FIG. 3c shows an expanded view of the image in FIG. 3b.

FIG. 3. a) $Fe_3O_4$ particles are deposited on a porous polymer matrix. This deposition renders such matrices magnetic and can therefore be used to isolate such polymers from solutions or mixtures; b) TEM images demonstrate that these nanoparticles are successfully deposited on the sidewalls throughout the polymer structure and that they have an average diameter ~7-10 nm (c.)

II) Non-Ultracentrifugation Based SWNT Purification:

The purification of well dispersed, individual SWNT and small bundled SWNT from large aggregates, bundles and metallic or other impurities has historically relied on ultracentrifugation at speeds in excess of 30,000 rpm. This process has several drawbacks. Firstly, ultracentrifugation at these speeds is potentially very dangerous because of the extreme forces generated. Furthermore, ultracentrifuges are very expensive. A single ultracentrifuge can cost in excess of $30,000. Also, with the current purification methods, each ultracentrifuge is limited to producing ~250 ml purified material after approximately 4 hours ultracentrifugation. This severely limits the scalability of any process which relies on this method. As such, finding methods to purify individually dispersed SWNT from SWNT slurries/mixtures has been a highly sought after goal from an engineering scalability standpoint. Accordingly, a method for preparing such well dispersed solutions without the use of ultracentrifugation is now described.

Figure 4A:
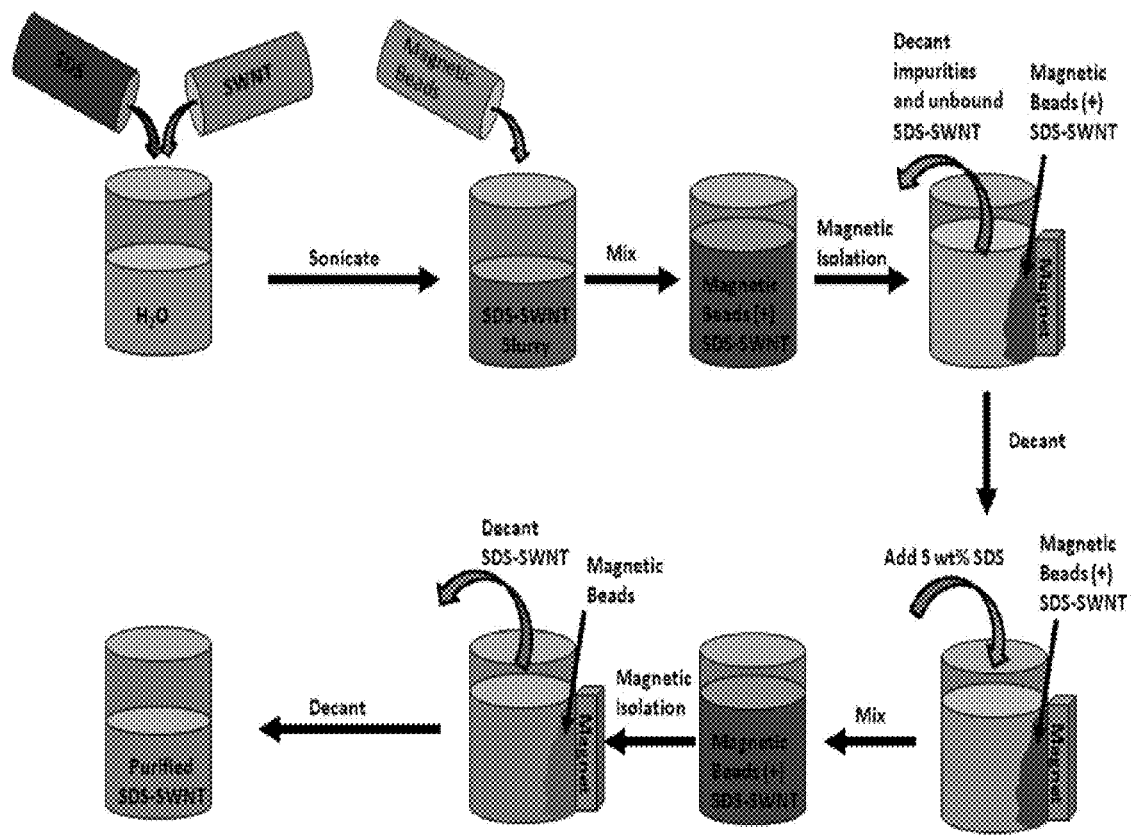
FIG. 4a outlines a non-limiting method for extracting purified SWNT solutions using selectively porous microparticles, according to some embodiments.

The method described in this example employs magnetic microparticles (e.g., beads) which act as selective adsorbants for SWNT. Exemplary beads can be seen in FIG. 3. Here, $Fe_3O_4$ nanoparticles are grafted onto the surface of Sephacryl HR S-200 framework. The resulting magnetic bead displays with a porous structure with a framework which demonstrates selective adsorption/adhesion of SWNT materials relative to their larger and more amorphous impurities. It is believed that this selectivity results from the SWNT having a higher binding energy to the framework of the magnetic bead relative to impurities. It is also likely that larger impurities may be screened from much of the surface area of the bead framework due to simple size exclusion principles. This selectivity ultimately provides for a route to purify SWNT solutions in a relatively simple and easy and scalable process which avoids the use of ultracentrifugation. A general outline demonstrating an exemplary method is shown in FIG. 4a. Here, sodium dodecyl sulfate (SDS) is mixed with a solid SWNT sample followed by sonication. The resulting SDS-SWNT slurry is then mixed with the as formed magnetic beads and the solution is allowed to mix thoroughly. After through mixing, the sample is placed in a magnetic field which is used to magnetically isolate the magnetic beads along with any adsorbed materials. The supernatant material (e.g., see FIG. 3) is decanted and the beads are washed with 1-2 wt % SDS in nanopure $H_2O$ and re-magnetically isolated. Following this washing step, elution of the adsorbed material is performed by adding a "de-sorbant." Here, this elution is accomplished using 5 wt % SDS or 2 wt % sodium cholate (SC) in nanopure $H_2O$. After thorough mixing, the beads are again magnetically isolated and the eluted material is extracted.

Figure 4B:
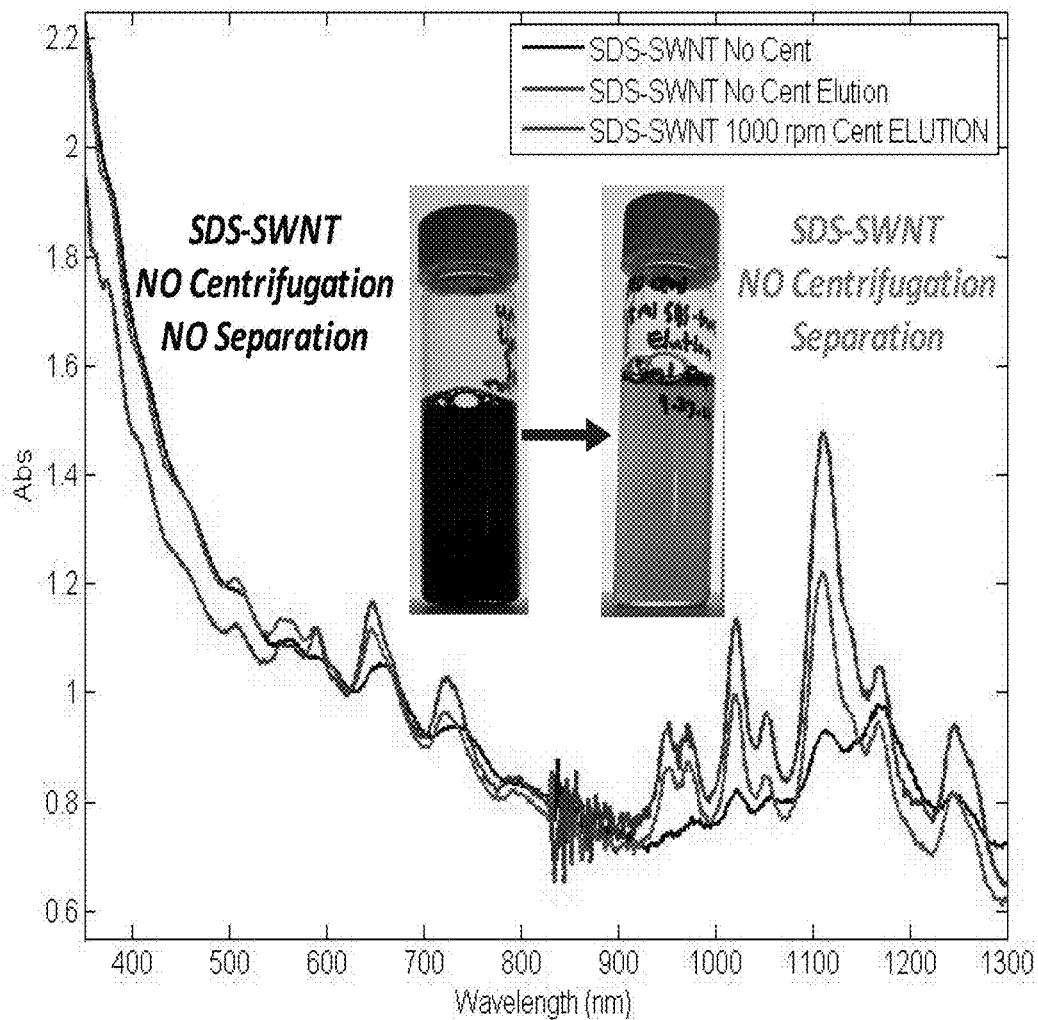
FIG. 4b shows magnetic isolation magnetic porous microparticles, according to some embodiments.
Figure 4C:
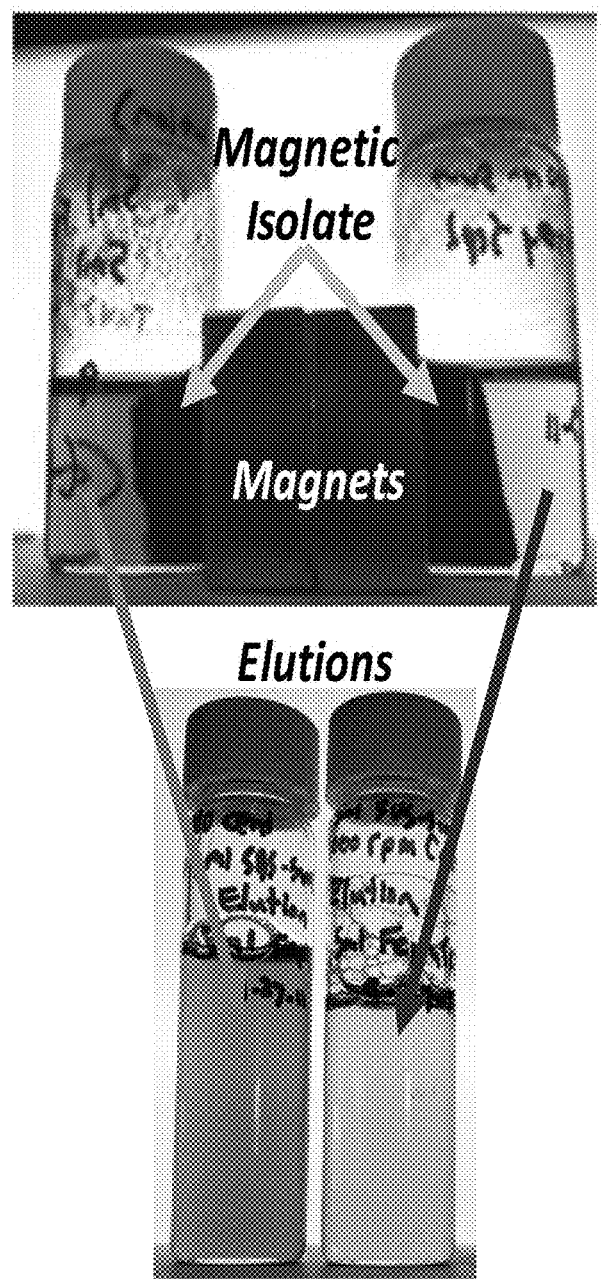
FIG. 4c shows photoabsorption spectra of isolated carbon-based nanostructures, according to some embodiments.

Such magnetic isolation and extraction of eluted material can be seen in FIG. 4b. In this figure, both as-sonicated SDS-SWNT material and SDS-SWNT that had been subjected to 1000 rpm centrifugation for 1 hr at 4° C. have been purified. This purification ultimately results in the spectra displayed in FIG. 4c. It is obvious from this spectra purified SDS-SWNT material can be isolated using this process.

FIG. 4. a) The general process of extracting purified SWNT solutions using selectively adsorbant magnetic beads is outlined; b) After such a process is followed, purified samples of individually, well dispersed SWNT may be isolated; c) Photoabsorption spectroscopy can be utilized to demonstrate the resulting purification of such well dispersed individual SWNT samples.

III) Exemplary Covalent Chemistry (Diazonium, Click Chemistry, Etc.):

Covalent chemistries can present a useful route to separating SWNT, as by electronic type. In general, the electronic structure of carbon-based nanomaterials depends on the dimensions of the material, and the connectivity of the carbon atoms. Several chemistries, which include, but are not limited to, those involving diazonium salts, react in a manner such that kinetics of the reaction are highly dependent upon the electronic structure of the carbonaceous substrate. Thus, such chemistries provide a useful route by which to separate SWNT by electronic type. Previously, such chemistries have been utilized in conjunction with free solution electrophoresis and density gradient ultracentrifugation in order to create nanotube solutions that are enriched in metallic and semiconducting species. Here, such chemistries are utilized, in conjunction with specifically engineered, electromagnetically-susceptible nanoparticles, to enable large-scale separation of SWNT by electronic type.

In the first approach, nanoparticles can be designed which possess functional groups that are capable of electronically-selective, and irreversible, reaction with the SWNT. Such functional groups include, but are not limited to diazonium salts. Because the utilized nanoparticles respond to electromagnetic fields, this approach allows for direct (and optionally immediate) reaction and separation of SWNT by electronic type.

In a second approach, it is possible to utilize bifunctional molecules which possess an electronically selective group, such as a diazonium ion, as well as a second moiety, which is capable of covalently binding with electromagnetically-susceptible nanoparticles. Such a technique requires two reaction steps, but may enable greater stoichiometric precision during the initial, electronically-selective reaction. For the second reaction step, in which selectively-reacted SWNT are tethered to electromagnetically-susceptible nanoparticles, a coupling reaction may proceed with both high selectivity and high conversion. Click chemistry, which includes, but is not limited to, copper-catalyzed azide-alkyne coupling, demonstrates such characteristics and could therefore be utilized in this step. By combining such a coupling chemistry with an appropriate, electronically selective reaction, one can scalably separate SWNT by electronic type. The ability to attach magnetically susceptible particles to SWNTs using approach two is shown in FIG. 5.

Figure 5:
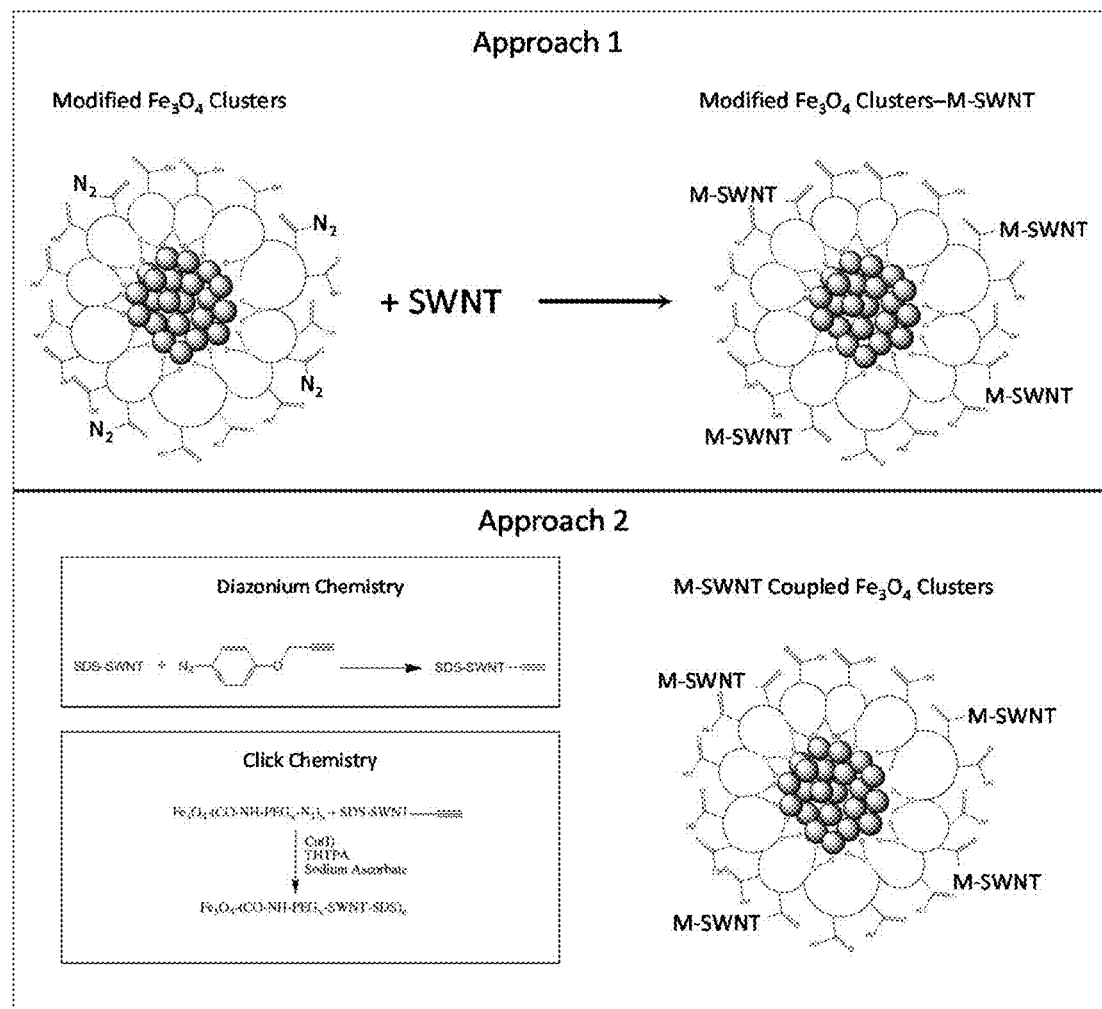
FIG. 5 illustrates non-limiting experimental routes of magnetic separation of carbon-based nanostructures, according to some embodiments.

FIG. 5. Depiction of two experimental routes toward magnetic separation of SWNT. In approach 1 (top), the iron oxide clusters can directly be modified with an electronically selective moiety, such as a diazonium salt. The second approach (bottom) utilizes a small, bifunctional molecule for the initial selective reaction, followed by a subsequent SWNT-nanoparticle coupling reaction.

Figure 6:
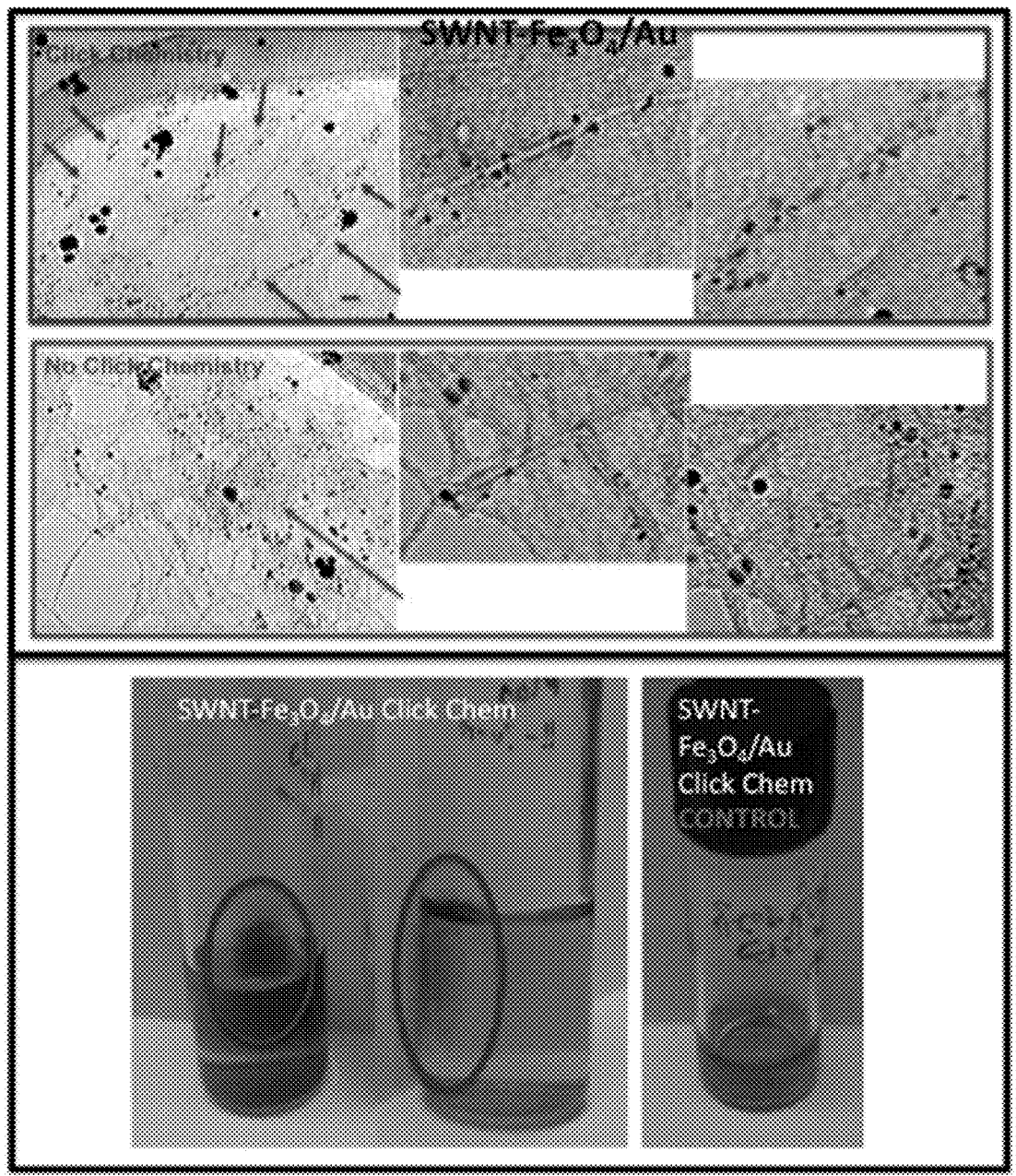
FIG. 6 depicts a separation method/system employing click chemistry, according to some embodiments.

FIG. 6. Demonstration of ability to click $Fe_3O_4$ nanoparticles onto carbon nanotubes, as evidenced by TEM (top) and ability to manipulate dispersed solutions of nanotubes (bottom).

Figure 7:
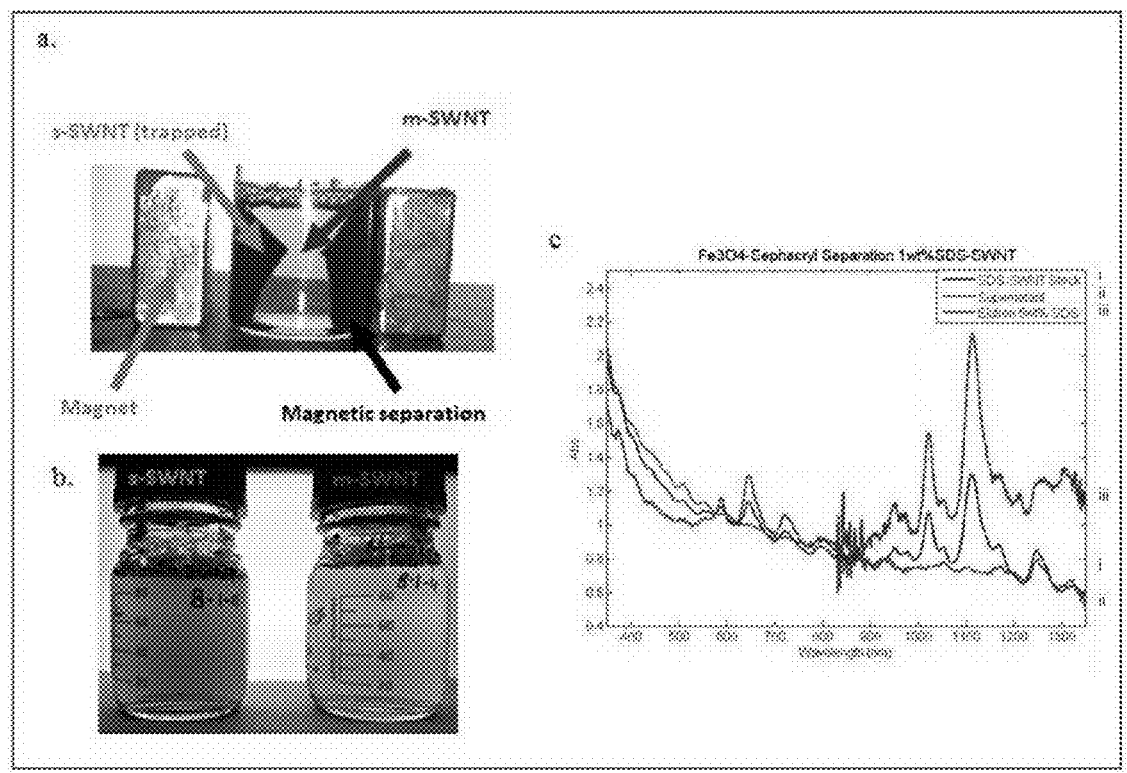
FIG. 7a shows the response of the magnetic separation of a material in the field of two bar magnets, according to a non-limiting embodiment.
FIG. 7b shows a picture of separated carbon nanotubes in large quantities, according to a non-limiting embodiment.
FIG. 7c shows an absorption spectra of the starting mixed material comprising various carbon nanotubes, and separated semiconducting and metallic carbon nanotubes, according to a non-limiting embodiment.
Figure 8:
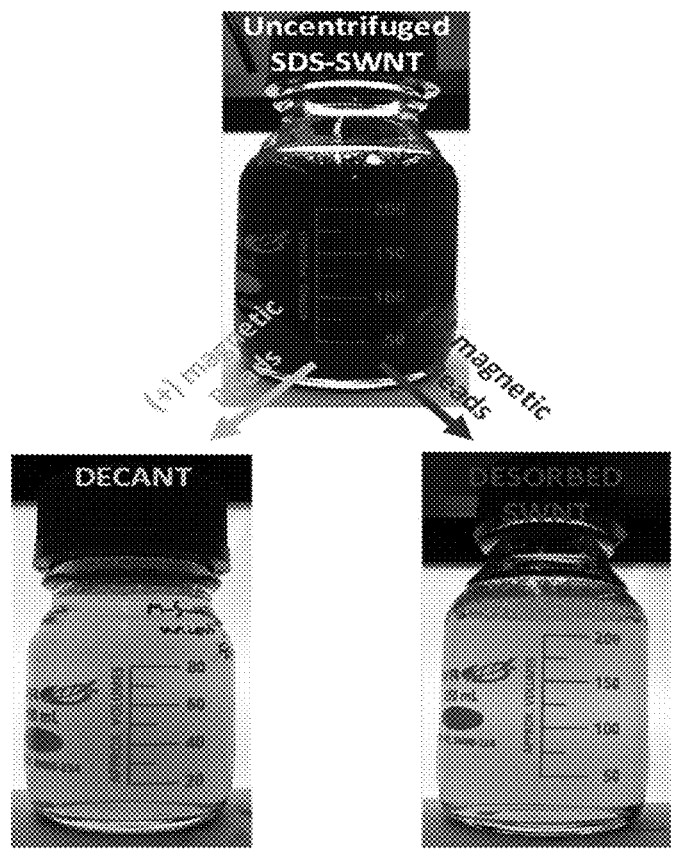
FIGS. 8 and 12 shows pictures of solutions of carbon-based nanostructures according to some embodiments, and corresponding graphs.
Figure 8:
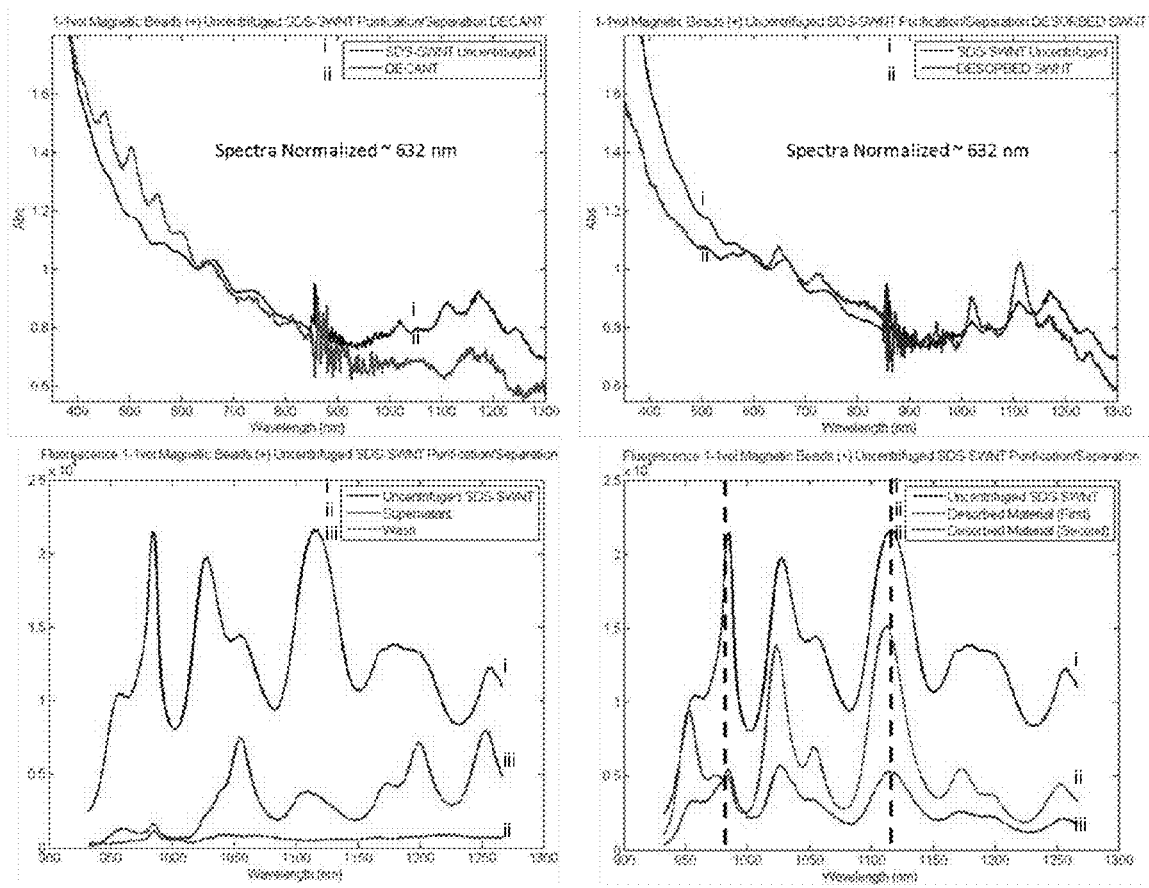

IV) Exemplary Non-Covalent Chemistry (Adhesion Including Sephacryl, Aminated Surfaces, Etc.):

Non-covalent chemistries can also be used in order to selectively bind SWNT. These chemistries include selective adhesion and adsorption. Non-covalent binding of the SWNT implies a lower binding energy and hence would require lower force based separation processes. While the processes themselves may be similar to those used in the case of covalently bound materials, such as magnetic fields, in general the forces may be lower so as to maintain the binding. The lower binding energy can be advantageous, especially when considering ease of removal of bound materials. This is important in several cases where selective binding of certain carbon species includes selective binding of the materials of interest. FIG. 7 demonstrates such a separation using a magnetic field that can be accomplished with simple permanent bar magnets. The magnetic separation material selectively binds to the semiconducting species of carbon nanotubes and can then be removed from the mixture with the application of the field from the magnet (FIG. 7a). The magnetic nanotubes may then be extracted and the semiconducting nanotubes which are bound to the magnetic separation material can be removed via the use of a solution phase separation method that maintains the suspension in the solution (FIG. 7b). In an exemplary experiment, as proof of the separation, absorbance spectra were taken of the separated material and the spectra clearly show either pure semiconducting or pure metallic species (FIG. 7c). Interestingly, in addition to such separation being demonstrated using ultracentrifuged SDS-SWNT samples, as is the case in FIG. 7, this separation is also demonstrated using SDS-SWNT samples in which no centrifugation has been implemented (FIG. 8). In this case, the SWNT samples are simultaneously purified and separated by electronic type. Ultimately, both separation methods are highly scalable; the magnetic separation schemes that may be implemented for such high throughput separation schemes will be discussed in a later section of this disclosure. Generally, the removal of the SWNT of interest include but are not limited to simple solution phase techniques that allow removal of the materials by magnetically isolating the bound complex and immersing it into a solution that breaks the association between the carbon material and the magnetic complex (as demonstrated above), as well as the application of higher force techniques to mechanically break this association.

FIG. 7. (a) Picture showing the response of the magnetic separation material in the field of two bar magnets which then allows for simple separation of the metallic carbon nanotubes (m-SWNT) from the semiconducting carbon nanotubes (s-SWNT); (b) Picture showing the separated carbon nanotubes in large quantities; (c) Absorption spectra of the starting mixed material (SWNT Stock, i), and the separated semiconducting (s-SWNT, ii) and metallic (m-SWNT, iii) carbon nanotubes.

The actual separation material comprises of a magnetic particle that is bound to a molecule or polymer that is able to reversibly bind the carbon material of interest. This binding will include the ability to use materials that allow for competitive binding mechanisms, where certain carbon materials have stronger interaction with the magnetic particle than other carbon materials. For example, the ability to have different interaction strengths of one species of nanotubes over the other species present in the heterogeneous mixture in question. In this manner it is possible to separate individual species and/or forms of carbon-based nanomaterials using a single magnetic separation material. This mechanism can work via the depletion of the strongest interaction material from the mixture and its extraction, and then depleting the second strongest interacting carbon material and so on. However, other schemes are also possible where the material of interest does not bind or a group of materials binds but another group does not, as is the case in the separation of metallic from semiconducting nanotubes.

FIG. 8. As suspended completely uncentrifuged SDS-SWNT can be directly used with such adsorbants to produce SWNT samples that are both purified and separated according to electronic type in a concerted process. Furthermore, this process involves no complicated procedures; all that is required is SWNT suspension, mixing with our magnetic beads, decantation, desorption, and a final decantation to produce such electronically separated samples in bulk quantities.

The materials themselves used for the selective adsorption/adhesion processes include but are not limited to forms of allyl dextrans crosslinked with N,N'-methylene bisacrylamide, and other aminated compounds linked to magnetic particles such that the material is now a hybrid material of a carbon binding component with the magnetic particle. Examples of such materials include magnetite nanoparticles bound to a polymer such as Sephacryl 200-HR.

Figure 9:
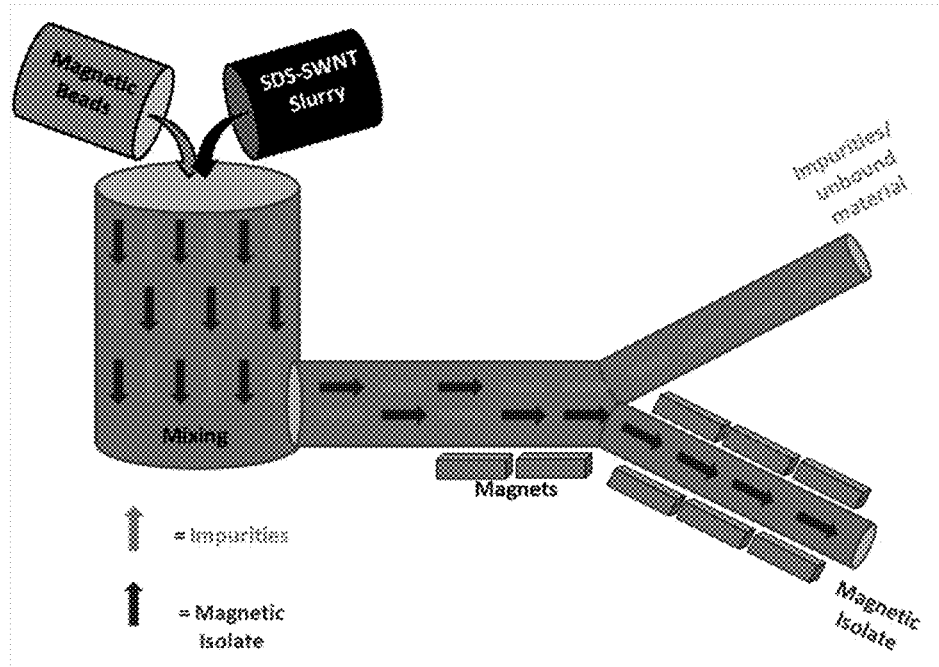
FIGS. 9, 10, 11, and 13 show non-limiting examples of magnetic separation techniques and/or methods, according to some embodiments.

V) Magnetic Separation/Isolation and Scaling:

After selective binding/bonding has been achieved, magnetic separation/isolation may be accomplished using one or more magnetic separation steps. These may include, but are not limited to, magnetic isolation, high-gradient magnetic separation (HGMS), and/or magnetic filtration. Magnetic isolation involves, but is not defined by placing a batch or sample in a magnetic field and extracting the magnetic particle with a "load" or bound carbon component. Alternatively, the magnetic field may be used to isolate this magnetic component and the non-magnetic material may then be removed, as by decantation. Examples of such magnetic isolation are shown in FIGS. 4, 6 and 7. HGMS may involve the use of a high surface area material which can provide for a large magnetic gradient; the heterogeneous material containing magnetic and selectively bound particle may then be placed in the high magnetic gradient and isolated. In this situation, the non-magnetic, and therefore un-bound material may then be removed and the isolated material may then be recovered by simply removing it from the magnetic field. Magnetic filtration may comprise specific carbon material in a heterogeneous solution phase mixture being bound to a magnetic particle and then redirecting its flow-rate or direction. Examples of such processes can be seen in FIGS. 9 and 10. In FIG. 9, a SWNT slurry/mixture is combined with magnetic beads and flowed through a chamber shaped as a "Y". This allows for the magnetic beads and any bound materials to be isolated by directing their flow relative to the impurity, which may be other metallic or carbon impurities, including SWNT of differing electronic type or chirality. Similarly, FIG. 10 demonstrates an apparatus in which the magnetic beads and suspended SWNT are mixed by opposing flows. As in FIG. 9, magnetic fields are utilized to direct the flow of the magnetic bead with its "payload" such that it may be isolated and extracted.

Finally, magnetic separation may be achieved by directly placing the source magnet, likely protected by some removable protective jacket, in the sample liquid in order to isolate and collect the magnetic material with its payload. This could either be accomplished in liquid samples which are stationary or flowing. In the case of batch separation, the magnetic material may be collected and retained while the supernatant, or non-adsorbed material, is decanted or otherwise extracted. Alternatively, this extraction may be achieved by removing the magnet with the payload material attached. After removing, perhaps iteratively, the magnet with bound payload, the magnet may be removed from the jacket and the payload material delivered to whatever container or alternate solvent is desired. In many cases, this solvent will first be a wash, followed by repeated magnetic removal and deposition into an environment whose conditions are appropriate for desorption of the payload material.

FIG. 9 shows a SWNT slurry/mixture is combined with magnetic beads and flowed through Y-shaped separator. This allows for the magnetic beads and any "payload" materials to be isolated by directing their flow relative to other metallic or carbon impurities.

Figure 10:
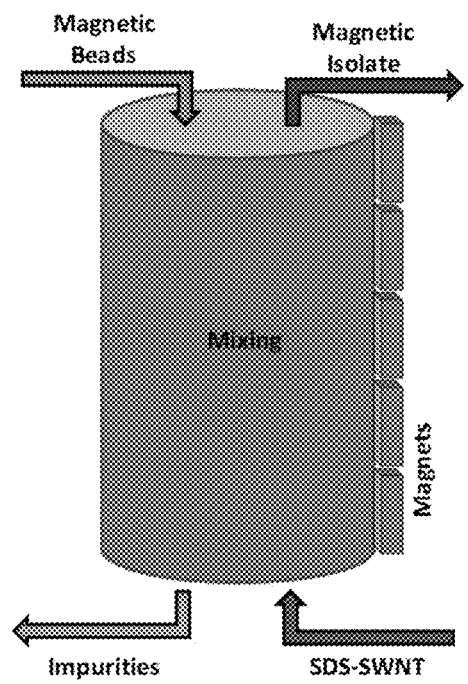

FIG. 10 shows an illustration of an apparatus in which the magnetic beads and suspended SWNT are mixed by opposing flows. Here, magnetic fields are utilized to direct the flow of the magnetic bead with its bound "payload" such that it may be isolated.

Figure 11:
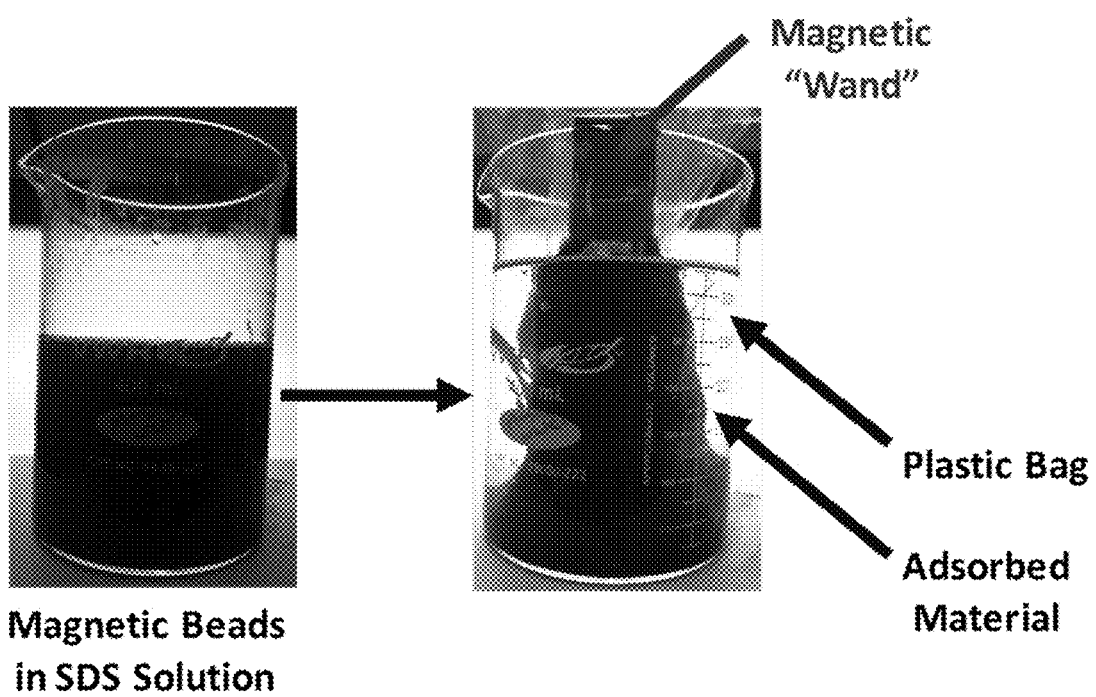

FIG. 11 shows a scheme in which a magnetic "wand" incased in a plastic or alternative casing is placed directly in the fluid containing magnetic beads, either flowing or stationary, and used for magnetic isolation/gathering.

Figure 14:
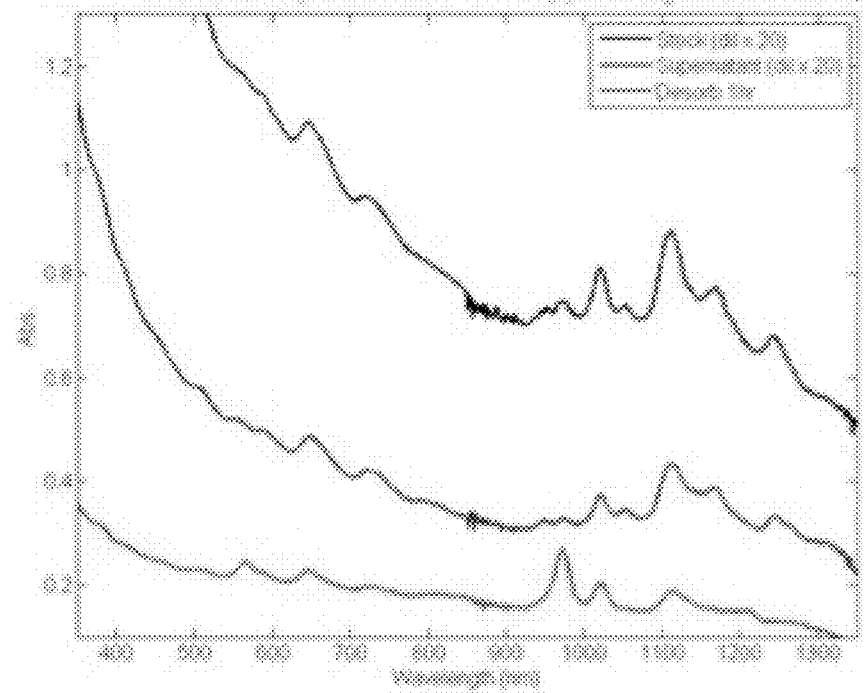
FIGS. 14 and 15 show data and pictures of isolated carbon nanotubes, wherein 97 mg of substantially purified nanotubes were isolated using the methods and systems described herein, according to some embodiments.
Figure 14:
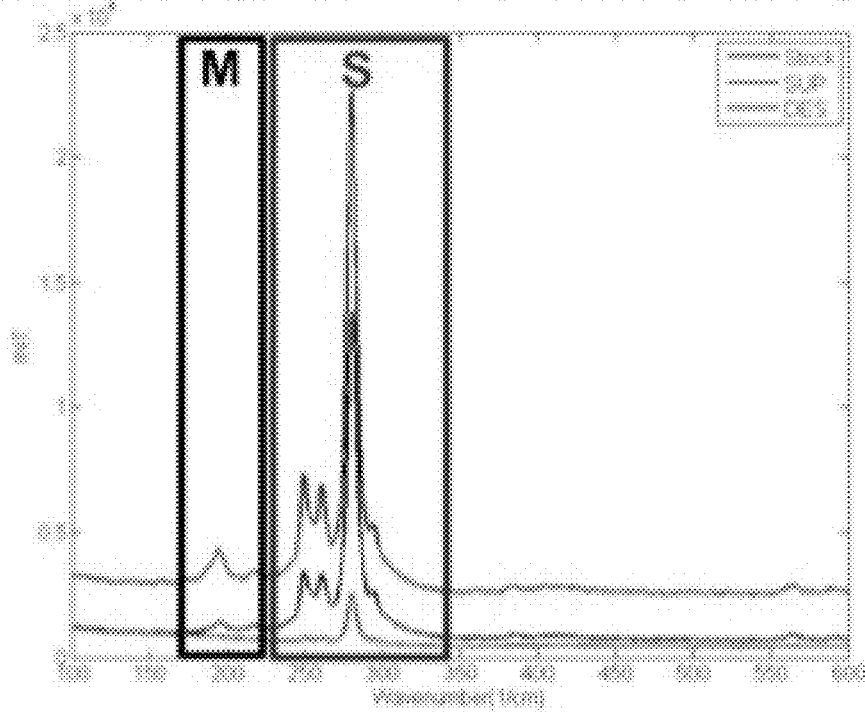
Figure 14:
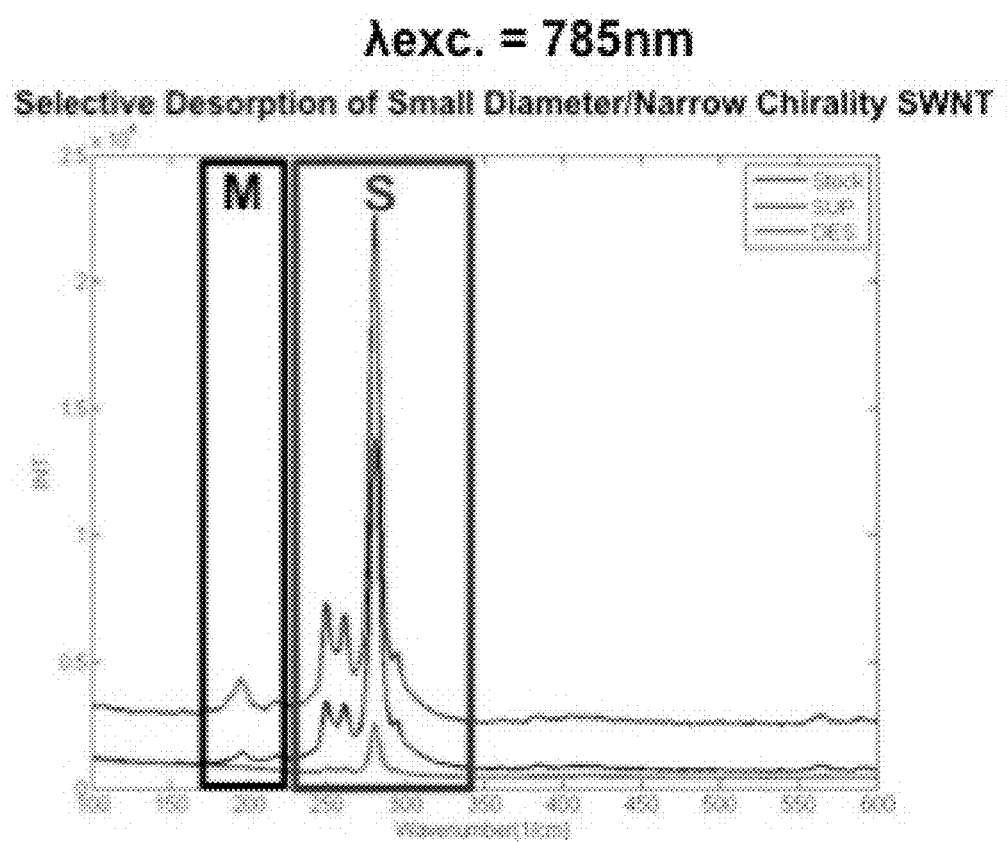
Figure 15:
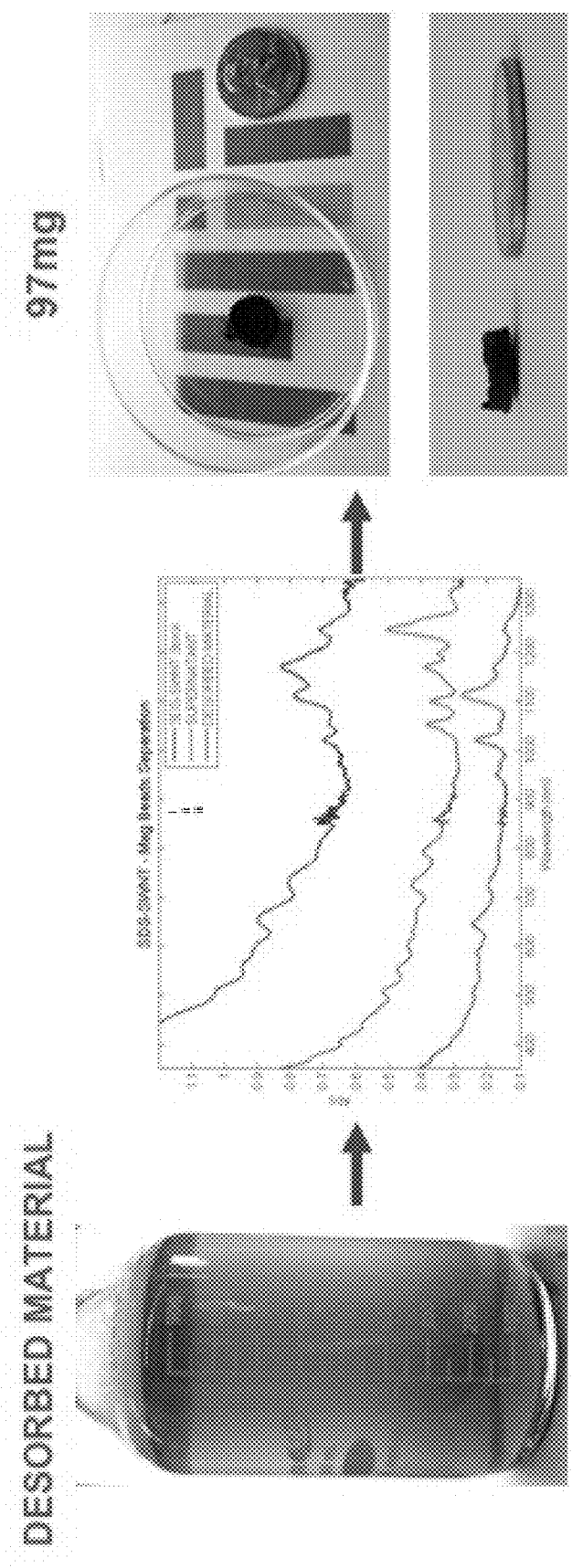

FIGS. 14 and 15 show data and pictures of isolated carbon nanotubes, wherein 97 mg of purified nanotubes were isolated using the methods and systems described herein.

Example 2

This examples describes a non-limiting embodiment of magnetic bead synthesis. This synthesis may be scaled up. See FIG. 3b.

Procedure:

1. Sephacryl generally is provided in ethanol (EtOH). Thoroughly washed with nanopure water (NP $H_2O$), allowing 4 fold excess to run through 100 ml sephacryl suspensions in a column.
2. After thoroughly washing sepahcryl, placed in 500 ml roundbottom flask with at least 2 necks and added $FeCl_3 \cdot 6(H_2O)$, $FeCl_2 \cdot 4(H_2O)$, NP $H_2O$ and stir bar.
3. Sealed contents with stoppers and reflux condenser, also equipped with a rubber stopper,

| Materials | Amount |
|---|---|
| Sephacryl HR S-200 | 50 ml |
| FeCl3•6(H2O) | 0.25 g |
| FeCl2•4(H2O) | 0.088 g |
| Ammonia Solution 27% in H2O (NH4OH, NH3•H2O) | 15 ml |
| NP H2O | 50 ml |
| N2 (UHP) | | and pumped $N_2$ into sealed container ~15-30 min so that all air is replaced by $N_2$ under vigorous stirring.
4. Removed $N_2$ inlet and outlet and heated from room temperature to 80° C. over ~15 min, then allowed to equilibrate for ~15 min @ 80° C. under reflux.
5. Rapidly injected $NH_4OH$ solution using a syringe and while sephacryl solution was vigorously stirring (solutions should turn black immediately).
6. Allowed to react for ~30 min (at least) and then cooled to room temperature.
7. Washed solution thoroughly with NP $H_2O$ either by passing NP $H_2O$ through material packed into column, as in step (1), or by repeated mixing and magnetic separation.

Example 3

Figure 12:
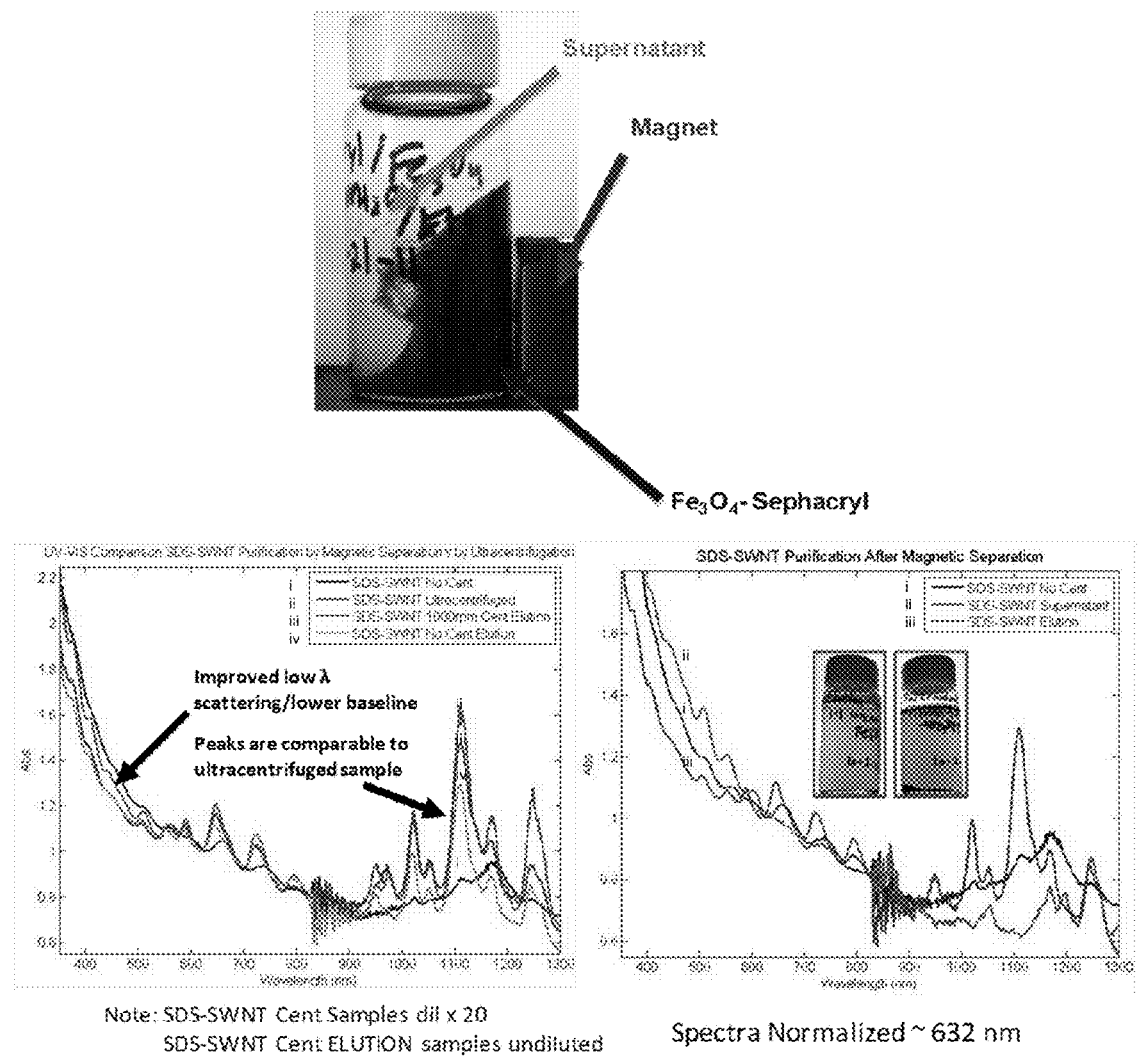

This examples describes a non-limiting embodiment of non-ultracentrifugation based purification of a mixture of carbon-based nanostructures. See FIG. 12.

Procedure:

1. Made stock of sodium dodecyl sulfate suspended single walled carbon nanotubes (SDS-SWNT), using 1 mg/ml SWNT suspended in 1 wt % SDS in NP $H_2O$ using ultrasonication (checked UV-VIS to ensure a good dispersion).
2. Washed Magnetic Beads with 4 fold volumetric (vol) excess of 2 wt % SDS in NP $H_2O$.
3. Placed 1:1 vol magnetic beads: SDS-SWNT in a vial and thoroughly mixed for ~12-24 hours to ensure appropriate equilibration
4. Placed vial next to neodymium magnet ($Br_{max}$=0.5 Tesla) and allowed magnetic beads to be isolated on the side of the container.
5. Pipetted off/decanted off "supernatant" material and stored as "supernatant" (this material generally shows some enrichment in m-SWNT, but should mostly contain

| Materials | Amount |
|---|---|
| Sephacryl HR S-200 | 100 ml |
| FeCl3•6(H2O) | 1 g |
| FeCl2•4(H2O) | 0.352 g |

-continued

| Materials | Amount |
|---|---|
| Ammonia Solution 27% in H2O (NH4OH, NH3•H2O) | 1 ml |
| NP H2O | 100 ml |
| N2 (UHP) | | contaminants and bundles).
6. Added 1 equivalent (by vol) of 2 wt % SDS and thoroughly mix ~15 min and repeated magnetic isolation and decantation, storing this decant as "wash".
7. Added 1 equivalent (by vol) of 5 wt % SDS and thoroughly mixed for ~1 hr-24 hr.
8. Repeated magnetic isolation and decantation, storing the decant as "elution".
9. Repeated steps (7) and (8) for second elution to ensure all SWNT have been removed from beads.
10. Thoroughly washed beads with 4 equivalents (by volume) NP $H_2O$ and 2 wt % SDS in NP $H_2O$ and stored for repeat usage.

Example 4

This examples describes a non-limiting embodiment of purification of a mixture of carbon-based nanostructures (m-SWNT/s-SWNT) employing ultracentrifugation.
Procedure:

| Materials | Amount |
|---|---|
| Magnetic Beads | ~ ml |
| Sodium dodecyl sulfate (SDS) | ~ g |
| Single Walled Carbon Nanotubes (SWNT) | ~ g |
| NP H2O | ~ ml |

1. Made stock of SDS-SWNT, using 1 mg/ml SWNT suspended in 1 wt % SDS in NP $H_2O$ (ultrasonication followed by ultracentrifugation @ 30,000 rpm ~4 hours).
2. Washed Magnetic Beads with 4 volume fold excess of 2 wt % SDS in NP $H_2O$.
3. Placed 1:1 vol magnetic beads: SDS-SWNT in a vial and thoroughly mixed for 15-30 min.
4. Placed mixture next to neodymium magnet and allowed to magnetically isolate (~5-10 min), followed by pipetting/decanting "supernatant" material (supernatant is enriched in m-SWNT).
5. Added 1 equivalent (by vol) 2 wt % SDS in NP $H_2O$ and thoroughly mixed (~5-15 min), followed by magnetic isolation and decantation of supernatant "wash" solution.
6. Added 1 equivalent (by vol) 5 wt % SDS in NP $H_2O$ and thoroughly mixed (~5-15 min), followed by magnetic isolation and decantation of supernatant "elution" solution (elution contained s-SWNT).

Example 5

Figure 13:
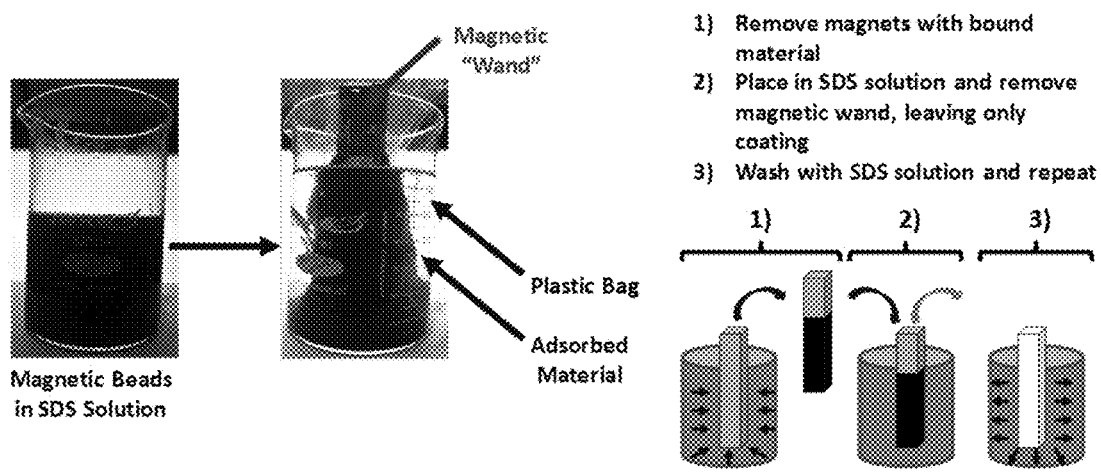

This examples describes a non-limiting embodiment of purification of a mixture of carbon-based nanostructures employing a "magnetic wand". See FIG. 13.

| Materials | Amount |
|---|---|
| Magnetic Beads | ~ ml |
| Sodium dodecyl sulfate (SDS) | ~ g |

-continued

| Materials | Amount |
|---|---|
| Single Walled Carbon Nanotubes (SWNT) | ~ g |
| NP H2O | ~ ml |

Procedure:
1. Prepared and washed magnetic beads.
2. Placed magnetic beads in desired solvent or mixture and mixed thoroughly.
3. Placed neodymium magnets (collection of magnets or "wand") in a protective coating, such as a plastic bag and then placed "wand" directly in solution containing magnetic beads and allowed to set.
4. Allowed magnetic beads to coat the "wand," and then removed the "wand" with magnetic material coating and placed in the new desired solvent solution.
5. Removed the magnet from the protective coating and rinsed (either by simple dunking/swirling or by squirt bottle) the magnetic beads (or beads with adsorbed "payload").
6. Repeated this process as many times as it took to transfer the full volume of magnetic beads originally added.

Example 6

This examples describes a non-limiting embodiment of purification of a mixture of carbon-based nanostructures (m-SWNT/s-SWNT) employing ultracentrifugation. See FIG. 15.

| Materials | Amount |
|---|---|
| Magnetic Beads | ~ ml |
| Sodium dodecyl sulfate (SDS) | ~ g |
| Single Walled Carbon Nanotubes (SWNT) | ~ g |
| NP H2O | ~ ml |

Procedure:
1. Made stock of SDS-SWNT, using 1 mg/ml SWNT suspended in 1 wt % SDS in NP $H_2O$ (using ultrasonication—checked UV-VIS to ensure that SDS-SWNT were well dispersed).
2. Washed Magnetic Beads with 4 volume fold excess of 2 wt % SDS in NP $H_2O$.
3. Placed 1:1 vol magnetic beads: SDS-SWNT in a vial and thoroughly mixed for ~12-24 hours to ensure appropriate equilibration (overnight).
4. Used Magnetic "Wand" separation procedure (Example 5 above) to transfer magnetic beads with SWNT "payload" into 2 wt % SDS in NP $H_2O$ for wash step, saving remaining material/decant as "supernatant".
5. After thoroughly washing/mixing, repeated Magnetic "Wand" separation (as in step 4) placing magnetic beads with adsorbed SWNT into 5 wt % SDS in NP $H_2O$ for desorption; again, saved remaining material/decant as "wash".
6. Thoroughly desorbed/mixed SWNT-magnetic bead mixture in 5 wt % SDS/NP $H_2O$ (~15-30 min).
7. Repeated Magnetic "Wand" separation to remove magnetic beads (placing in second volume of 5 wt % SDS/NP $H_2O$ if second desorption step was desired) and saved remaining material/decant as "Desorbed Material".
8. Thoroughly washed beads with 4 equivalents (by volume) NP $H_2O$ and 2 wt % SDS in NP $H_2O$ and stored for repeat usage.

Example 7

This example describes a hybrid material comprised of a superparamagnetic magnetite nanoparticle decorated polymer, which was successfully synthesized and applied to the simple and easily scalable separation of semiconducting and metallic single-walled carbon nanotubes (s-SWNT and m-SWNT) from as prepared, un-centrifuged and unpurified stocks.

A novel composition of amide baring high surface area magnetic beads that were used for the preparative scale separation of metallic and semiconducting single-walled carbon nanotubes from completely un-centrifuged, as-produced nanotube stocks. The purification of carbon nanotubes has presented a major technological barrier to scalable processing. The magnetoadsorptive beads utilized superparamagnetic magnetite nanoparticles formed on the surface of a porous amine containing polymer network. The construct was shown to selectively adsorb unpurified semiconducting single walled carbon nanotubes allowing subsequent removal using an external magnetic field. Furthermore, adsorbed single walled carbon nanotubes (SWNT) were easily desorbed from the construct. As such, this magnetoadsorptive beads were utilized directly with as-sonicated single walled carbon nanotube stocks to promote the separation of semiconducting as well as metallic SWNT species in quantitative scales. Also, single-chirality (6,5) semiconducting SWNT were isolated with 92% purity directly from unpurified stocks. Thermogravimetric analysis (TGA) indicated a SWNT yield of 1.7 and 2.0% in the case of s-SWNT and m-SWNT, respectively. These results demonstrated the potential for an industrially compatible method for separating carbon nanotubes based on electronic properties.

In this example, SWNT were single-layer graphitic tubes characterized by extremely high aspect ratios, large surface areas and nanometer sized diameters. These nanoscale dimensions imparted unique electronic, optical and physical characteristics which make them useful in a variety of applications. These nanomaterials have been increasingly produced in very large or bulk quantities. Applications including antennas and transparent conductive films require high purities of metallic carbon nanotubes, whereas applications including field effect transistors, energy harvesting and sensors require semiconducting carbon nanotubes. However, virtually all SWNT synthesis techniques produce mixtures of semiconducting and metallic SWNT. Furthermore, purification from other carbon by-products produced during SWNT synthesis remains an inhibitory issue, particularly at large scales.

This example describes a method for separating large quantitates of s-SWNT and m-SWNT from completely un-centrifuged and unpurified SWNT starting material. This separation was achieved using adsorption onto a magnetite-polymer construct that selectively bound s-SWNT with chirality specific binding energies. It was hypothesized that lone pair electrons on the amine containing polymer serve to selectively dope s-SWNT. As such, this doping depended on the electronic band structure of the SWNT material. Because of the larger surface electron density and highly compact surfactant packing onto m-SWNT, this same doping was not promoted in the case of m-SWNT. Furthermore, by decorating the structure of this polymer (sephacryl) with magnetite nanoparticles, the process of separating large-scale s-SWNT and m-SWNT samples occurred. Simple physical mixing of the magnetic polymer with as dispersed, un-centrifuged sodium dodecylsulfate (SDS)-SWNT stocks followed by isolation of the magnetic polymer, with s-SWNT payload, was utilized to achieve separation of SWNT by electronic type. The processes outlined here were easily scaled for industrial processing and achieved single chirality s-SWNT as well as high quality m-SWNT separation. Furthermore, the amount of SWNT material achieved from such separation processes was quantified.

Magnetic bead synthesis, as illustratively shown in FIG. 16A, was accomplished by co-precipitating Fe(II) and Fe(III) chlorides onto the surface of the polymer skeletal structure. FIG. 16A shows the proposed complexation scheme of the nanoparticles to the Sephacryl structure (proposed partial structure shown) utilized the oxygen species in the polymer structure during the coprecipitation reaction. Formation was confirmed using TEM analysis. TEM analysis showed that the polymer structure was successfully decorated with nanoparticles having an average diameter of 10 nm. Furthermore, TEM analysis gave no indication of significant changes to the original polymeric structure. Specifically, it should be noted that the porous structure appeared well conserved. This fact was significant, as it was hypothesized that the association of the s-SWNT with the lone pair electrons on the structure of the porous magnetic sephacryl was crucial for the binding of s-SWNT to the absorption sites of the sephacryl structure, as was discussed earlier and shown in FIG. 16B. FIG. 16B shows the mechanism of the binding of s-SWNT to the sephacryl resulted from lone pair electrons on the amine containing polymer that selectively dope s-SWNT. Further, the magnetic nanoparticles that have been formed were both superparamagnetic and attached to the polymeric structure of the Sephacryl. Here, magnetic isolation of these beads was conducted simply using a neodymium magnet (0.5 T $Br_{max}$). Within approximately one minute, all of the beads were easily isolated. This process allowed for the residual solution, herein referred to as the supernatant, to be easily decanted.

FIG. 4A outlines the process used to selectively adsorb s-SWNT to the magnetic beads allowing for their removal from the stock material, which also contained m-SWNT and amorphous carbon. Achieving the appropriate SWNT dispersion was key to separation of s-SWNT and m-SWNT. As such, in the case of s-SWNT isolation, extended ultrasonication was used to achieve a large population of singly dispersed or small bundles of s-SWNT. As a corollary, sonication for shorter durations dispersed small bundles of SWNT in higher populations relative to individual s-SWNT. This allowed for small bundles of s-SWNT and individually dispersed s-SWNT to be more completely removed from solution by a given number of binding sites, leaving highly enriched m-SWNT. In both cases, after each binding site on the magnetic bead has been allowed to equilibrate with the SDS-SWNT solution, the magnetic beads were isolated using simple magnetic separation. For s-SWNT separation, after iterative washes and repeated magnetic separations, the beads were subjected to a 5 wt % SDS solution, which acted to desorb the s-SWNT material from the magnetic beads.

Figure 17:
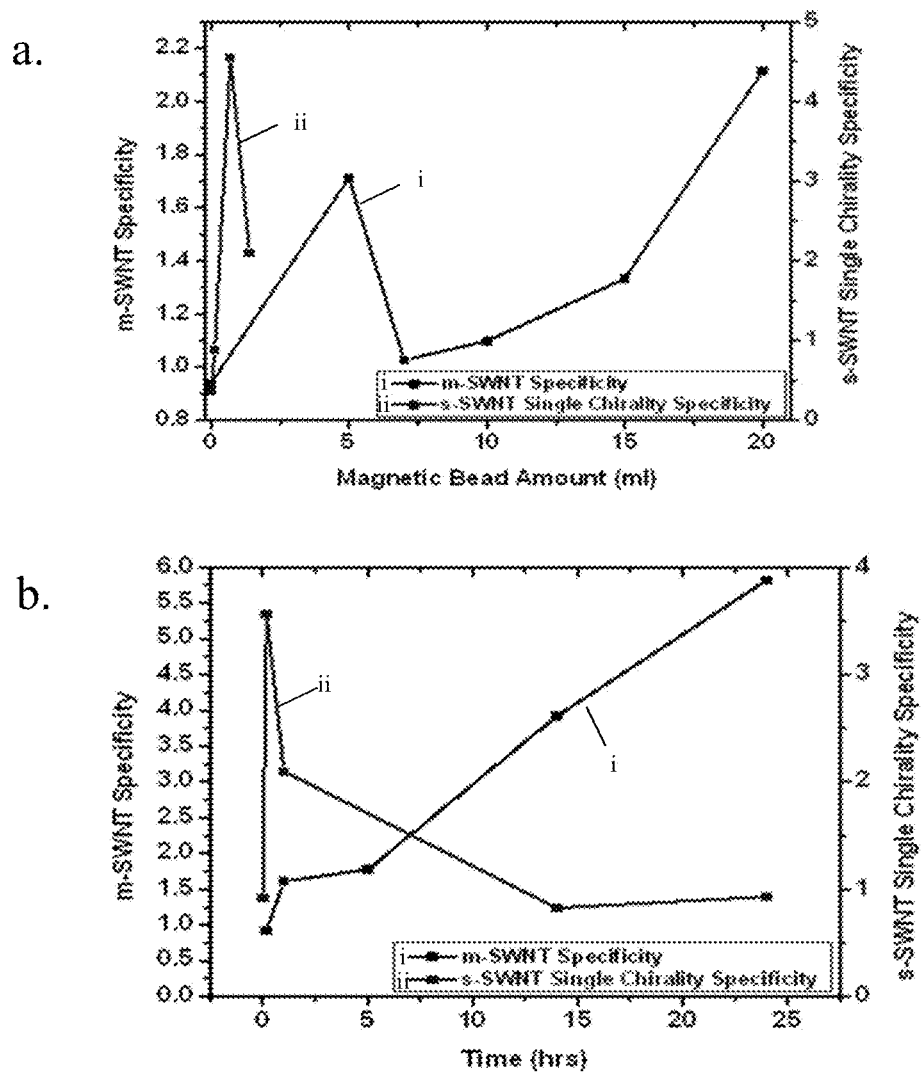
FIG. 17a shows a graph of carbon-based nanostructures specificity versus magnetic bead amount, according to a non-limiting embodiment.
FIG. 17b shows a graph of carbon-based nanostructures specificity versus time, according to a non-limiting embodiment.
Figure 19:
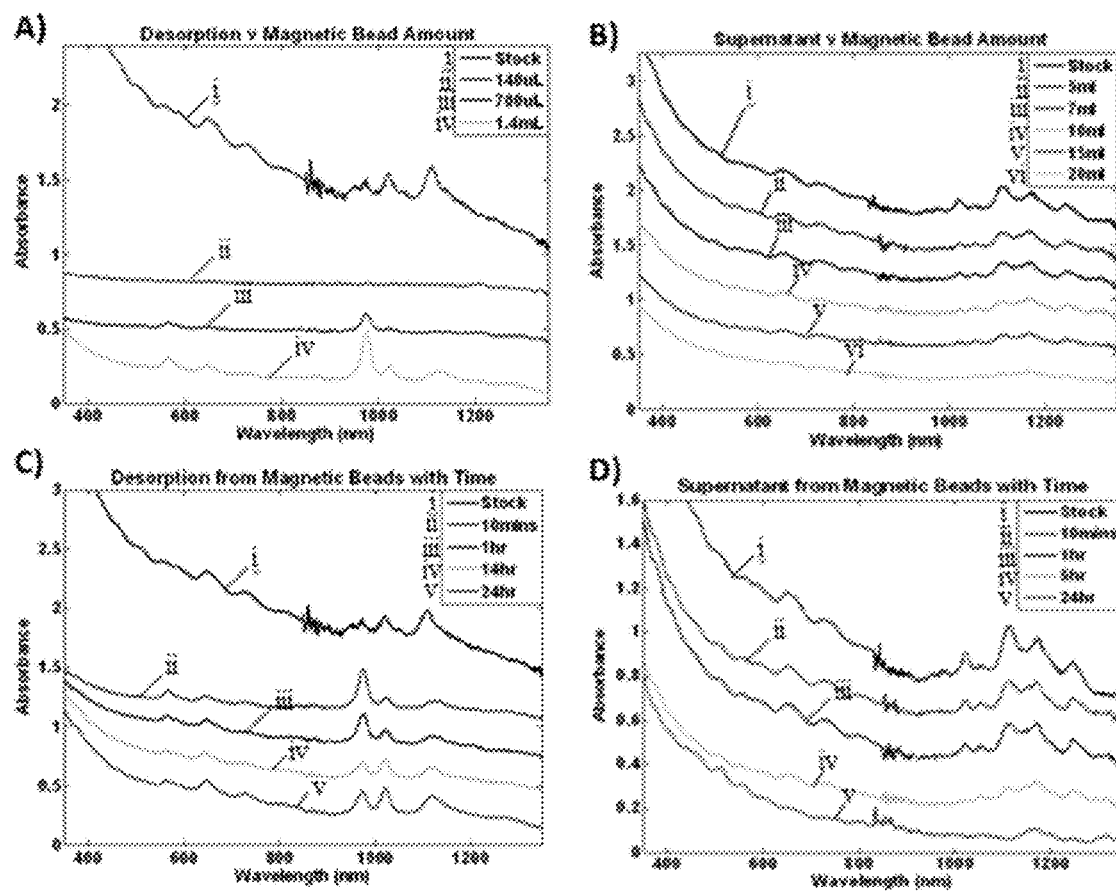
FIG. 19a shows an absorbance spectrum for desorbed material with various amounts of magnetic beads, according to a non-limiting embodiment.
FIG. 19b shows an absorbance spectrum for the supernatant with various amounts of magnetic beads, according to a non-limiting embodiment.
FIG. 19c shows an absorbance spectrum for desorbed material at various time intervals, according to a non-limiting embodiment.
FIG. 19d shows an absorbance spectrum for the supernatant at various time intervals, according to a non-limiting embodiment.

This mechanism of separation allowed for the systematic study of the interaction between the magnetic beads and SDS-SWNT stocks. Specifically, both the relative concentration, as shown in FIG. 17A, and the interaction time, as shown in FIG. 17B, of SDS-SWNT and magnetic beads were varied for each stock. Photoabsorption was conducted to analyze the resulting separated material. Accordingly, the normalized peak-to-valley absorption difference for a characteristic m-SWNT peak at 515 nm relative to the peak-to-valley absorption difference of the (6,5) s-SWNT at 990 nm was taken as a metric to analyze the effectiveness of m-SWNT purification, or m-SWNT specificity. Similarly, the normalized peak-to-valley absorption difference of the (6,5)

s-SWNT (990 nm) relative to the peak-to-valley absorption difference of the (7,5) s-SWNT (1025 nm) was taken as a metric to analyze the single chirality specificity of the separated material in each case. This was because the (6,5) s-SWNT had the strongest binding affinity to the magnetic beads and was therefore the first to demonstrate single-chirality separation using this method. All experiments were performed using 10 ml of SDS-SWNT stock material. By increasing the amount of magnetic beads, the number of binding sites was increased relative to the same concentration of SWNT, leading to increased amounts of adsorbed s-SWNT. However, this increased amount of binding sites also resulted in a decrease in selectivity towards (6,5) s-SWNT as shown in FIG. 17. This fact agreed well with the asserted "overload mechanism" where the bead first adsorbs the nanotube that binds most strongly to magnetic beads, resulting in pure (6,5) SWNT. This trend held until 700 µl of magnetic beads were implemented, below which relatively small amounts of SWNT were adsorbed correlating to the relatively small number of binding sites. However, further increasing the amount of binding sites, with increasing amounts of magnetic beads, effectively decreased the effect of the competitive binding between SWNT chiralities of the starting material. A similar trend was observed for experiments holding the amount of magnetic beads, and therefore binding sites, as well as the concentration of SDS-SWNT constant, while varying their interaction time as shown in FIG. 17B. Here, it was observed that increasing the interaction time served to accumulate more s-SWNT material onto the polymer, and again resulted in a decreased selectivity towards (6,5) SWNT. Furthermore, comparing the relative peak intensities of the desorbed material from 10 min and 24 hours demonstrated a slight decrease in the absorption intensity for (6,5) s-SWNT and a notable increase in the peak intensities for other s-SWNT such as (7,5). This indicated that rather than populating all or a majority of the available binding sites initially, the binding sites were biased kinetically towards the adsorption of the strongest binder, which was the (6,5) s-SWNT. However, given long enough interaction times, this preferential binding was lost and other s-SWNT begin to populate the binding sites of the beads, as indicated by the decreasing s-SWNT single chirality specificity with time as shown in FIG. 17B. FIG. 19 shows the photoabsorption data correlating to FIG. 17A-B.

Similar trends were observed for experiments done on m-SWNT purified samples. Again, the effect of the relative concentration and interaction time of SDS-SWNT and the magnetic beads were investigated. However, the starting materials for these experiments were sonicated for two rather than twenty hours, and had SDS concentration of 1 wt % rather than 2 wt %. These conditions likely resulted in a larger population of bundled SWNT due to the less extensive sonication and smaller concentration of surfactant. However, since m-SWNT may be more easily suspended in SDS, this effect was seen more significantly in the population of s-SWNT. Ultimately, the ability of bundled s-SWNT to bind to the magnetic beads was demonstrated by this experiment and was utilized to produce highly enriched m-SWNT samples. As was seen by the m-SWNT specificity (see, e.g., FIG. 17A), increasing the amount of magnetic beads, and therefore the number of binding sites, promoted the more complete adsorption of SDS-SWNT. However, by varying the number of binding sites to a large excess of SDS-SWNT, no selectivity of adsorption towards s-SWNT was promoted. With this in mind, holding the concentration of binding sites constant but increasing the interaction time with the SDS-SWNT was shown to bias the adsorption of the SDS-SWNT towards s-SWNT to a larger degree than increasing the concentration of binding sites as shown in FIG. 17B. After approximately twenty four hours of mixing, most of the s-SWNT appear to be removed from the sample, primarily leaving peaks in the m-SWNT region (approximately 400-620 nm) of the photoabsorption spectra, as shown in FIG. 19, and a large m-SWNT specificity. These experiments support the assertion that this binding mechanism for separating s-SWNT acted most efficiently in the regime of smaller concentrations of binding sites relative to SDS-SWNT, in some embodiments. Furthermore, it highlighted that this mechanism may be exploited to isolate highly enriched m-SWNT samples simply using a single step directly after SWNT suspension.

Figure 16:
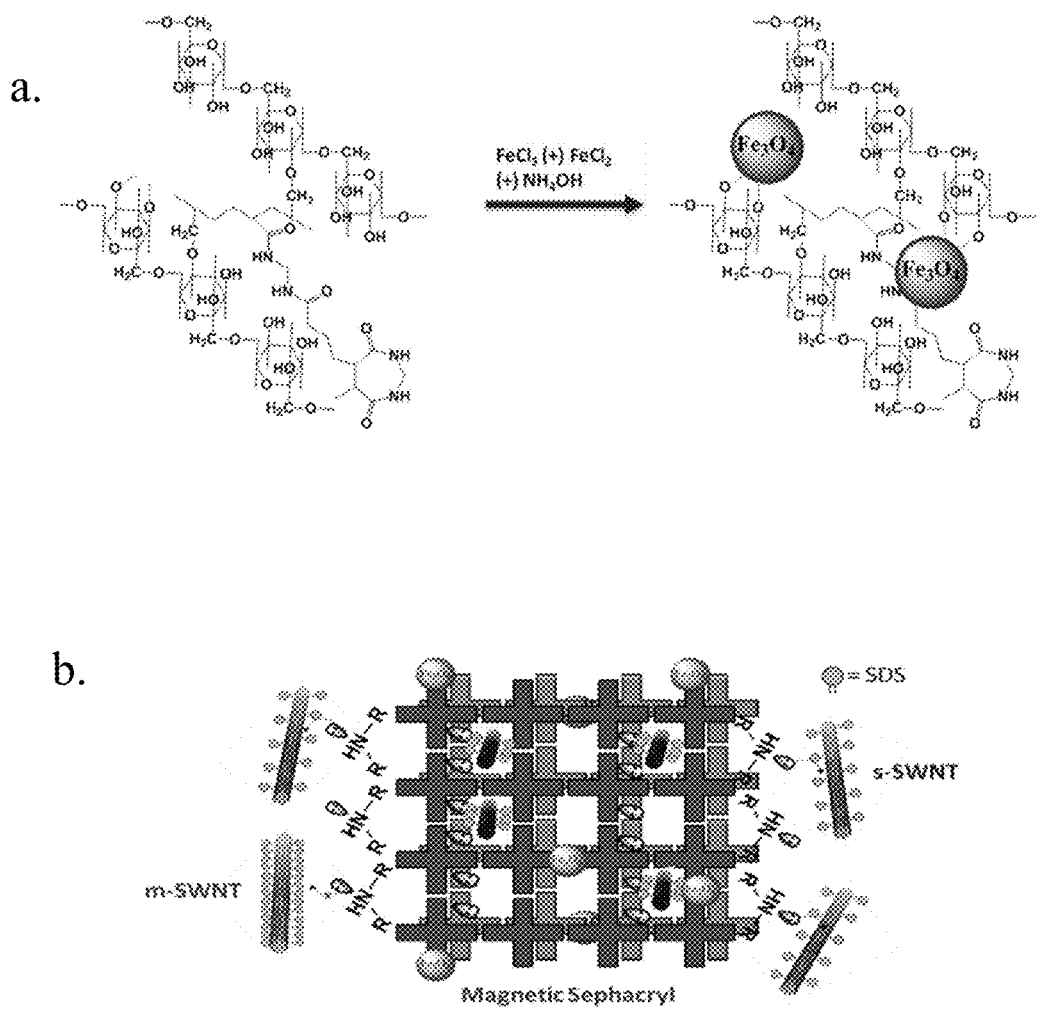
FIG. 16a shows a complexation between a polymer and a nanoparticle, according to a non-limiting embodiment.
FIG. 16b shows a schematic of binding between carbon-based nanostructures and a porous microparticle, according to some embodiments.

FIG. 16 shows one mechanism of the binding of s-SWNT to the sephacryl results from lone pair electrons on the amine containing polymer that selectively dope s-SWNT. Because of the larger electron density and more compact surfactant packing onto the surface of m-SWNT, this same binding mechanism was not promoted in the case of m-SWNT. Functionalization of the polymer with magnetite nanoparticles allowed the simple and fast extraction of these magnetic beads from colloidal suspension. The selective s-SWNT adsorption and the magnetic nanoparticle complexation allows for the magnetic polymer to be easily utilized in isolating s-SWNT as well as m-SWNT species through simple mixing.

FIG. 17 shows the effects of the added magnetic bead amount (a) and the interaction time (b) on the m-SWNT and s-SWNT separation processes. FIG. 17a held the SDS-SWNT stock volume at 10 ml and the interaction time at 10 min for s-SWNT samples (ii) and 1 hr for m-SWNT (i) samples, whereas FIG. 17b held the magnetic bead volume: SDS-SWNT stock volume to be 1.4:10 ml for s-SWNT samples (ii) and 5:10 ml for m-SWNT samples (i).

FIG. 19 shows that single chirality (6,5) s-SWNT with 92% purity were isolated from as-sonicated Unidym stocks using the magnetic beads of the present invention without the use of centrifugation of any kind. Similarly, the sonication and incubation procedure were simply modified for the isolation of m-SWNT from Unidym stocks. This was observed across SWNT stocks, as demonstrated through the isolation of s-SWNT and m-SWNT samples from Nano-C source material. Using this technique, large amounts of highly concentrated separated m-SWNT and s-SWNT were isolated. The amount of separated SWNT was substantial enough to be used for TGA quantification of SWNT yield relative to amorphous carbon and metal catalyst, being estimated to be approximately 1.7-2.0% in the case of s-SWNT and m-SWNT, respectively.

Figure 18:
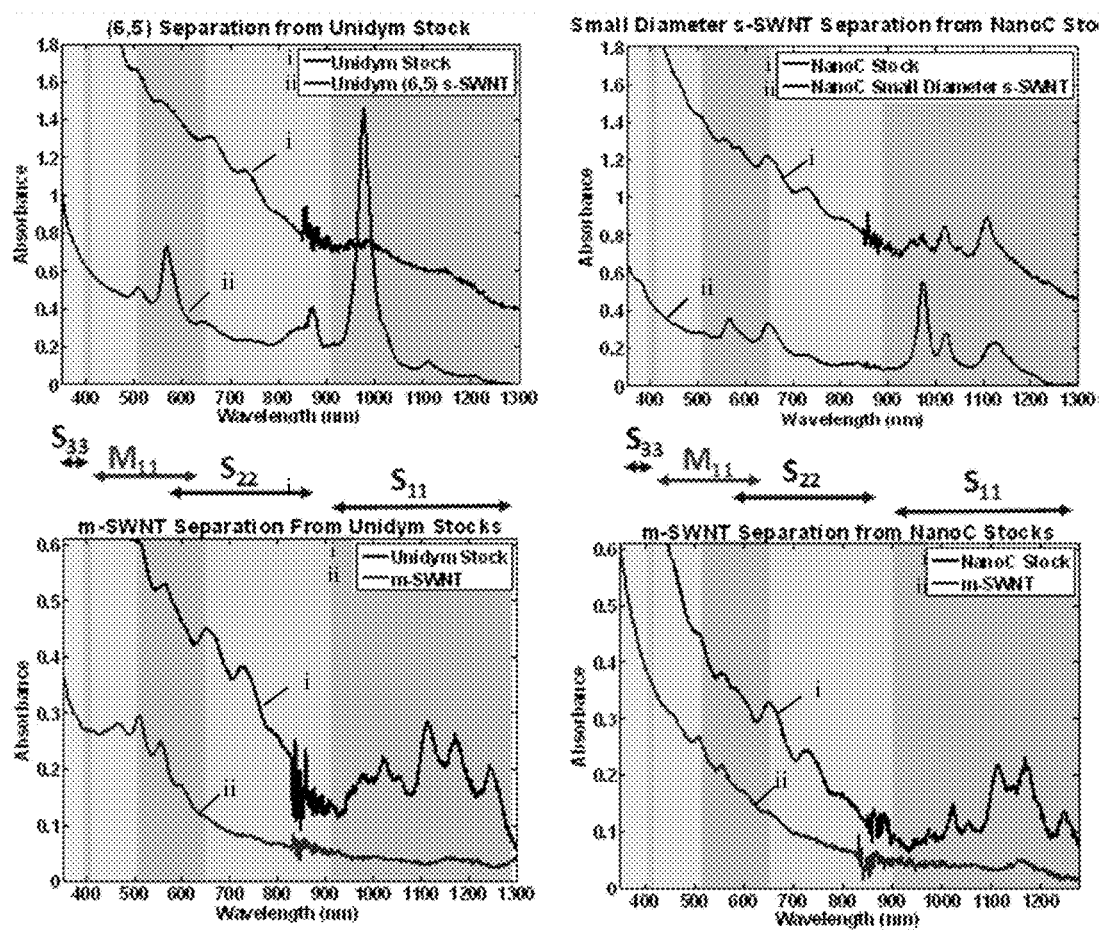
FIG. 18 shows absorbance spectra of separated carbon-based nanostructures and the starting material, according to some embodiments.
Figure 20:
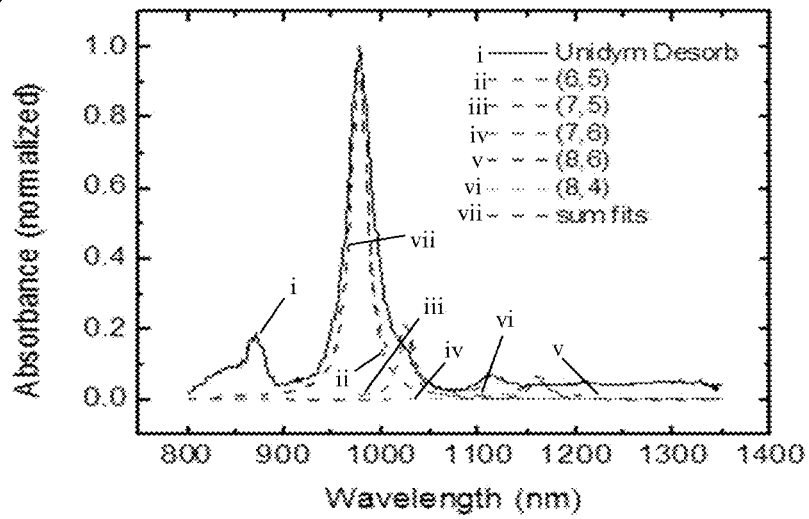
FIG. 20a shows a peak deconvolution absorbance spectrum for Unidym and the purified carbon-based nanostructures that varied in chirality, according to some embodiments.
FIG. 20b shows a peak deconvolution absorbance spectrum for Nano-C and the purified carbon-based nanostructures that varied in chirality, according to a non-limiting embodiment.
Figure 20:
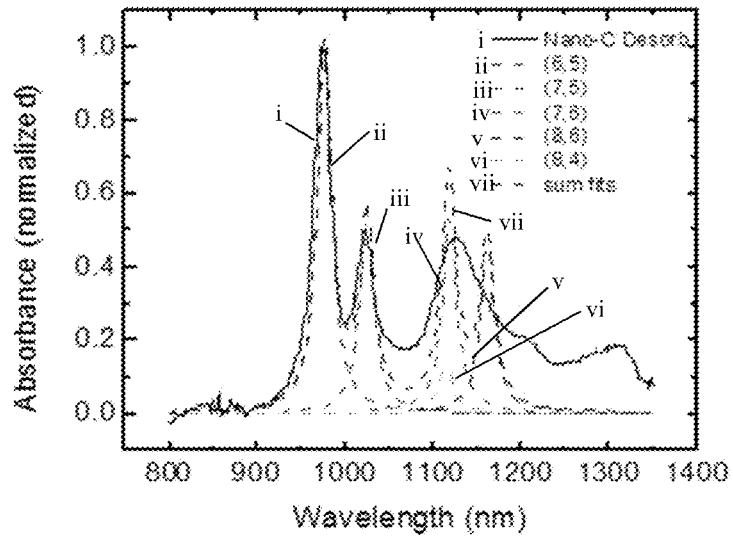

Better understanding the mechanism of adsorption between the SDS-SWNT and the magnetic beads allowed for the tuning of the reaction parameters to promote the highest selectivity across each separation. FIGS. 18 and 20 display that, using completely uncentrifuged stock materials, enrichment of small diameter, single chirality (6,5) and highly enriched m-SWNT was achieved using this simple method. FIG. 18 shows the isolation of single chirality (6,5) s-SWNT and m-SWNT from Unidym stocks and Nano-C source material. FIG. 20A-B show absorbance spectra for A) a solution highly enriched in (6,5) s-SWNT and B) a solution composed almost entirely of (6,5) s-SWNT completely devoid of m-SWNT that were isolated from both Nano-C and Unidym starting materials. Furthermore, this method was demonstrated using various starting materials, indicating that the method could easily be adapted independent of the source stock. Significant lowering of the baseline scattering was observed in photoabsorption spectroscopy when comparing both s-SWNT and m-SWNT isolated material to the beginning stock material. This indicated that there was adsorption of significant amounts of amorphous carbon and large nanotube bundles. Additionally, this adsorption appeared to be irreversible under the conditions outlined here. In addition to the improvement in baseline scattering, evidence of this phenomenon was seen in the improved relative peak-to-valley absorption of both s-SWNT and m-SWNT isolated materials. These improvements indicated that the amount of amorphous carbon and large nanotube bundles had been significantly reduced in both samples. This adsorption was further supported by analyzing the peak positions of photoabsorption and fluorescent spectra for adsorbed and subsequently desorbed samples. This process promoted a blue-shifting in both types of spectra, which was indicative of samples with fewer impurities such as bundles and other contaminants. This was an important point, as the purification of m-SWNT depended, in some embodiments, on adsorption and removal of s-SWNT and amorphous carbon, whereas the purification of s-SWNT depended, in some embodiments, on the preferential desorption of s-SWNT. As such, both processes depended, in some embodiments, heavily on the interaction of the magnetic beads with amorphous impurities and large bundles relative to the interaction of magnetic beads to SDS-SWNT. The ultimate benefit of this method was seen most directly by the amount of separated SWNT that was easily achieved using this method. In each case, 1 L of highly concentrated separated liquid was isolated from as-sonicated, completely un-centrifuged stock SWNT suspensions. The scale of this separation may be limited only by the sonication capabilities of the laboratory scale and were easily increased. TGA performed in air was used to analyze the SWNT purity for both separated solid samples. SWNT decomposition was derived based on assigning minima in the rate of change of the weight loss. This analysis indicated a relative SWNT content of 34% and 40% for the solid s-SWNT and m-SWNT samples, which translated to an overall separation yield of 1.7 and 2.0% in the case of s-SWNT and m-SWNT, respectively.

FIG. 18 shows that increasing the volume of magnetic bead solution added to 10 ml of as-sonicated 2 wt % SDS-SWNT increased the amount of s-SWNT material isolated within a 10 minute incubation time. However, beyond an optimal amount, the chirality distribution broadened with increasing magnetic bead volume. This same trend of increasing SWNT removal with increasing magnetic bead volume was observed for SDS-SWNT stocks prepared 1 wt % SDS and under more mild sonication. Similar to increasing the magnetic bead amount, increasing the interaction time of the magnetic beads and both extensively sonicated 2 wt % SDS-SWNT and mildly sonicated 1 wt % SDS-SWNT served to more thoroughly remove a broader range of s-SWNT chiralities from the as-dispersed stocks.

FIG. 20 shows a) highly enriched in and b) composed almost entirely of (6,5) s-SWNT completely devoid of m-SWNT were isolated from both Nano-C and Unidym starting materials. FIG. 20a demonstrates a yield of 92% purity of (6,5) using Unidym material while FIG. 20b shows that a composition of 41% (6,5), 25% (8,4), 18% (8,6), and 15% (7,5) was obtained using Nano-C material.

In conclusion, a centrifuge free method for accomplishing m-SWNT, s-SWNT and even single-chirality (6,5) SWNT separation from as-produced SWNT stocks was described. By utilizing super-paramagnetic sephacryl, m-SWNT and s-SWNT products were easily isolated simply by varying the sonication procedure, SDS concentration and interaction time between the SWNT solution and magnetic polymer. As such, this study was able to give greater insight into the interaction of SWNT with this polymer. Furthermore, resulting from the simplicity of this method and because it required no purification of any kind, large quantities of separated SWNT products were easily isolated with a yields of 1.7 and 2.0% for each of s-SWNT and m-SWNT samples.

Example 8

This example describes the materials and experimental methods used in Example 7. SWNT raw material was received from Nano-C and used without further processing. Unidym material was washed following the manufacturer instructions. Sodium dodecyl sulfate (SDS), methanol, $FeCl_3.6(H_2O)$ and $FeCl_2.4(H_2O)$ were purchased and used as received from Sigma Aldrich. Sephacryl 5200 HR was purchased from GE Healthcare. Polytetrafluoroethylene filters (0.2 μm pore diameter) were purchased from Millipore.

The magnetic bead formation was performed as follows. Ethanol was first removed from as-received Sephacryl 5200 HR. The Sephacryl was then washed thoroughly with water to remove excess ethanol and other impurities before being suspended 1:1 vol in nanopure water (NP $H_2O$). The suspended Sephacryl solution was then placed in a roundbottom flask equipped with two necks and a stir bar. $FeCl_3.6(H_2O)$ (18 μmol/ml sephacryl solution) and $FeCl_2.4(H_2O)$ (9 μmol/ml sephacryl solution) were then added to the solution and stirred vigorously. One of the two necks of the roundbottom flask was then outfitted with a reflux condenser and the other was capped with a rubber septum. Ultra-high purity $N_2$ gas was then bubbled through the solution in order to remove oxygen. The $N_2$ flow was then stopped and the solution was heated to 80° C. over 15 minutes and allowed to temperature equilibrate for an additional 15 minutes. Ammonium hydroxide solution (28% by weight in $H_2O$, 5 μl/ml sephacryl solution) was then rapidly injected. The stirring solution immediately turned black, but was allowed to react for 30 minutes before cooling slowly to room temperature. The black coloration was known to be associated with the successful formation of $Fe_3O_4$ nanoparticles, as has been demonstrated previously.[32] This synthesis scheme was outlined in FIG. 16A. After formation of the magnetic sephacryl, or magnetic beads as they will be referred to in this text, the material was washed thoroughly with NP $H_2O$. The beads were then stored in NP $H_2O$ for future use.

SWNT stock was formed as follows. Typically, SDS-SWNT stocks were made using 1 mg/ml SWNT ultrasonicated using a half inch tip operating at 20 W for 24 hours in 2 wt % SDS for s-SWNT separations and 20 W for 2 hours in 1 wt % SDS for m-SWNT separations.

Magnetic separation of s-SWNT was performed as follows. For material made using Unidym stocks, magnetic beads were added to ultrasonicated SDS-SWNT stock at 14% by volume and this mixture was allowed to stir vigorously for 1 hour. The magnetic beads were then isolated using a neodymium magnetic array. After decanting the non-adsorbed SWNT suspension, or supernatant, the magnetic adsorbant was mixed with equivalent volumes of 2 wt % SDS for 10 minutes, followed by re-magnetic isolation and decantation of unbound material. This washing step was repeated three times, or until photoadsorption spectra indicated no evidence of residual suspended SWNT. After decanting the final wash, approximately 40% volume of 5 wt % SDS was added to the magnetic beads and the mixture was again stirred for 10 minutes. This step was followed by magnetic isolation of the beads and decantation of the remaining solution. This step served to desorb the adsorbed material, and this final solution was analyzed. A similar procedure was used for material made from Nano-C stocks, with the only differences being that 7% magnetic beads were used with this starting SWNT solution.

m-SWNT separation was performed as follow. For both Unidym and Nano-C SWNT stock solutions, magnetic beads were added to ultrasonicated SDS-SWNT stocks at 50% by volume and the mixtures were stirred for 24 hours. After such time, the magnetic beads were magnetically isolated and the unadsorbed, m-SWNT enriched material was isolated as the supernatant.

Pellets were formed as follows. Separated SWNT material was crashed out of SDS solution using methanol. Pellets were initially collected via centrifugation and decantation of methanol/SDS/NP $H_2O$ solution, followed by re-dispersion via vortex shaking in a minimal amount of NP $H_2O$. This collected material was then collected via filtration using 0.2 µm filters.

The following techniques were used for characterization. Transmission Electron Microscopy (JOEL 2000FX TEM operating at 200 kV acceleration voltage) was conducted in order to confirm the successful formation of nanoparticles in the polymer matrix of the Sephacryl starting material. Ultraviolet-visible-near infrared (UV-VIS-nIR) spectroscopy (Shimadzu UV-3101PC UV-vis-NIR scanning spectrophotometer) as well as Raman spectroscopy (Horiba Jobin Yvon HR800) was performed on each starting material and desorbed material in order to confirm electronic type enrichment. Thermogravimetric analysis (TGA, TA Instruments Q50) was performed in order to estimate the recoverability and purity of the isolated SWNT material.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed:

1. A method of at least partially separating a first type of carbon-based nanostructure from at least one second type of carbon-based nanostructure, comprising:

providing a plurality of porous magnetic particles, wherein each of the plurality of porous magnetic particles comprise a plurality of nanoparticles associated with the magnetic particles;

exposing the plurality of porous magnetic particles to a mixture of carbon-based nanostructures comprising the first type of carbon-based nanostructure and the at least one second type of carbon-based nanostructure, wherein the first type of carbon-based nanostructure is attracted to and/or associates with the porous magnetic particles to an extent greater than that of the at least second type of carbon-based nanostructure; and at least partially separating the porous magnetic particles from the mixture of carbon-based nanostructures, thereby collecting a set of carbon-based nanostructures that is enriched in the first type of carbon-based nanostructure.

2. The method or article as in claim 1, wherein the carbon-based nanostructures are nanotubes.

3. The method or article as in claim 1, wherein the carbon-based nanostructures are single-walled carbon nanotubes or multi-walled carbon nanotubes.

4. The method as in claim 1, wherein the first type of carbon-based nanostructure is metallic.

5. The method as in claim 1, wherein the at least one second type of carbon-based nanostructure is non-metallic or substantially non-metallic.

6. The method as in claim 1, wherein the plurality of porous magnetic particles are associated with the plurality of nanoparticles.

7. The method as in claim 1, wherein the plurality of nanoparticles associated with the porous magnetic particles are selected so as to facilitate separation the magnetic particles from a medium.

8. The method as in claim 1, wherein the plurality of nanoparticles are magnetic.

9. The method as in claim 1, wherein the plurality of nanoparticles are ferromagnetic, ferrimagnetic, paramagnetic, or superparamagnetic.

10. The method as in claim 1, wherein the plurality of porous magnetic particles have an average size between about 1 um and about 500 um, between about 40 um and about 500 um, between about 50 um and about 500 um, between about 40 um and about 40 um, between about 50 um and about 400 um, between about 40 um and about 300 um, between about 50 um and about 300 um, between about 50 um and about 200 um, or between about 50 um and about 100 um.

11. The method as in claim 1, wherein the plurality of nanoparticles have an average size between about 1 nm and about 1 um, between about 1 nm and about 500 nm, between about 1 nm and about 400 nm, or between about 1 nm and about 200 nm, between about 1 nm and about 100 nm, between about 1 nm and about 50 nm, between about 10 nm and about 50 nm, between about 10 nm and about 40 nm, between about 10 nm and about 30 nm, or between about 15 nm and about 25 nm.

12. The method as in claim 1, further comprising at least one wash step.

13. The method as in claim 1, further comprising dispersing the mixture of carbon-based nanostructures prior to exposing the carbon-based nanostructures to the plurality of porous magnetic particles.

14. The method as in claim 1, wherein the porous magnetic particles are collected using magnetic techniques and/or methods.

15. The method as in claim 1, wherein the magnetic particles comprises a plurality of functional groups.

16. The method as in claim 1, wherein the at least partially separating step comprises collecting the porous magnetic particles, thereby collecting a set of carbon-based nanostructures that is enriched in the first type of carbon-based nanostructure.

17. The method as in claim 1, wherein the set of carbon-based nanostructures that is enriched in the first type of carbon-based nanostructure is at least partially separated from the porous magnetic particles.

18. An article, comprising:
a porous magnetic particle; and
a plurality of nanoparticles associated with the porous magnetic particles, selected to facilitate separation of the magnetic particles from a medium.

\* \* \* \* \*